US011082083B2

(12) United States Patent
Blanchard et al.

(10) Patent No.: US 11,082,083 B2
(45) Date of Patent: *Aug. 3, 2021

(54) NODE HAVING A MULTI-USER RAKE RECEIVER FOR USE IN A COOPERATIVE BROADCAST MULTI-HOP NETWORK THAT EMPLOYS BROADCAST FLOOD ROUTING AND MULTI-HOP TRANSMISSION WITH COOPERATIVE BEAMFORMING

(71) Applicant: General Dynamics Mission Systems, Inc., Fairfax, VA (US)

(72) Inventors: Scott David Blanchard, Strawberry, AZ (US); David Kunil Lee, Tempe, AZ (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,905

(22) Filed: Oct. 23, 2019

(65) Prior Publication Data
US 2020/0313718 A1    Oct. 1, 2020

Related U.S. Application Data

(60) Provisional application No. 62/823,420, filed on Mar. 25, 2019.

(51) Int. Cl.
*H04J 13/00*    (2011.01)
*H04B 1/7115*    (2018.01)
(Continued)

(52) U.S. Cl.
CPC .......... *H04B 1/7115* (2013.01); *H04B 1/715* (2013.01); *H04B 7/026* (2013.01); *H04B 7/0456* (2013.01);
(Continued)

(58) Field of Classification Search
USPC ........................ 375/130, 148, 232
See application file for complete search history.

(56) References Cited

U.S. PATENT DOCUMENTS 6,181,729 B1 *    1/2001    O'Farrell ............... H04B 1/707
                                                                         375/130
6,618,433 B1 *    9/2003    Yellin .................. H04B 1/7105
                                                                         375/144
(Continued)

FOREIGN PATENT DOCUMENTS

EP    1292043 A1    3/2003
EP    2254263 A2    11/2010
WO    2018223145 A2    12/2018

OTHER PUBLICATIONS

Juma Ben Saleh et al, Random Network Coding Effects on CDMA/TDD Mesh Networks, Communication Networks and Services Research Conference (CNSR), 2011 Ninth Annual, IEEE, pp. 224-230, May 2, 2011.

*Primary Examiner* — Eva Y Puente
(74) *Attorney, Agent, or Firm* — LKGlobal | Lorenz & Kopf, LLP

(57) ABSTRACT

A node is provided that is configured to communicate in a cooperative broadcast multi-hop network that employs broadcast flood routing and multi-hop transmission using a direct-sequence spread-spectrum (DSSS) waveform. The node includes an antenna and a waveform module having a receiver processing chain. The antenna can receive a plurality of DSSS signals from other nodes on a particular channel, and output a channel that includes the plurality of DSSS signals. The plurality of DSSS signals include transmissions that are directly received from other nodes and multi-path components of those transmissions. The receiver processing chain can include a multi-user RAKE receiver that can combine, when performing demodulation process-
(Continued)

ing, a plurality of transmissions directly received from the other nodes and multipath components of transmissions received from the other nodes. In some implementations, the node can perform cooperative beamforming and adaptive space-spectrum whitening.

20 Claims, 9 Drawing Sheets

(51) Int. Cl.

| | | |
|---|---|---|
| *H04B 7/12* | (2006.01) | |
| *H04W 4/10* | (2009.01) | |
| *H04B 17/336* | (2015.01) | |
| *H04B 1/715* | (2011.01) | |
| *H04B 7/0456* | (2017.01) | |
| *H04B 7/06* | (2006.01) | |
| *H04B 7/08* | (2006.01) | |
| *H04L 1/00* | (2006.01) | |
| *H04L 27/26* | (2006.01) | |
| *H04B 7/026* | (2017.01) | |
| *H04W 24/08* | (2009.01) | |

(52) U.S. Cl.
CPC ......... *H04B 7/0617* (2013.01); *H04B 7/0632* (2013.01); *H04B 7/0857* (2013.01); *H04B 7/12* (2013.01); *H04B 17/336* (2015.01); *H04L 1/0054* (2013.01); *H04L 1/0061* (2013.01); *H04L 27/2628* (2013.01); *H04L 27/2649* (2013.01); *H04W 4/10* (2013.01); H04B 2201/709718 (2013.01); H04J 13/004 (2013.01); *H04L 1/0067* (2013.01); *H04L 1/0071* (2013.01); *H04W 24/08* (2013.01)

(56) References Cited

U.S. PATENT DOCUMENTS

| | | | |
|---|---|---|---|
| 6,647,077 B1 * | 11/2003 | Shan | H04B 1/7113 |
| | | | 370/206 |
| 6,898,430 B1 * | 5/2005 | Liberti | H04B 7/0848 |
| | | | 455/11.1 |
| 6,947,403 B2 | 9/2005 | Heikkila et al. | |
| 7,577,122 B1 | 8/2009 | Hoffmann et al. | |
| 7,684,465 B1 | 3/2010 | Dabak et al. | |
| 9,628,996 B2 * | 4/2017 | Chae | H04W 16/14 |
| 2003/0091100 A1 * | 5/2003 | El Nahas El Homsi | |
| | | | H04B 1/71075 |
| | | | 375/143 |
| 2005/0032479 A1 | 2/2005 | Miller et al. | |
| 2005/0063480 A1 | 3/2005 | Tsung-Liang et al. | |
| 2005/0130616 A1 * | 6/2005 | Khayrallah | H04B 1/707 |
| | | | 455/242.2 |
| 2006/0072654 A1 * | 4/2006 | Nielsen | H04B 1/7115 |
| | | | 375/148 |
| 2007/0127422 A1 * | 6/2007 | Belcea | H04W 64/00 |
| | | | 370/338 |
| 2007/0173199 A1 | 7/2007 | Sinha | |
| 2008/0009288 A1 | 1/2008 | Dalmases et al. | |
| 2008/0171515 A1 * | 7/2008 | Kim | H04W 56/0035 |
| | | | 455/63.1 |
| 2008/0232238 A1 | 9/2008 | Agee | |
| 2009/0313528 A1 * | 12/2009 | Chugg | H04B 7/026 |
| | | | 714/758 |
| 2011/0019608 A1 | 1/2011 | Aghvami et al. | |
| 2012/0236924 A1 * | 9/2012 | Sahlin | H04B 1/7115 |
| | | | 375/232 |
| 2014/0101485 A1 | 4/2014 | Wegener | |
| 2014/0286174 A1 | 9/2014 | Iizuka et al. | |
| 2017/0026205 A1 | 1/2017 | Agee | |
| 2018/0109354 A1 | 4/2018 | Ahirwar et al. | |

* cited by examiner

| Mode | FH | DS-SS | Number OVSF Data | Spreading Factor | BPSK | QPSK | Cooperative Broadcast Diversity Beam Combining | Multi-Hop | Broadcast Coding | Rate 1/4 | Rate 1/2 | Rate 3/4 | Hopping Mode 3600 hps | Single Frequency Mode |
|---|---|---|---|---|---|---|---|---|---|---|---|---|---|---|
| | | | | | | | Network | | Coding PHY: LDPC+BCH | | | | Effective Information Bit Rate (kbps) | |
| 1 | 0 | x | 1 | 32 | x | | x | x | x | x | | | 7 | 9.5 |
| 2 | 0 | x | 1 | 32 | x | | x | x | x | | x | | 14 | 19 |
| 3 | 0 | x | 1 | 32 | | x | x | x | x | | x | | 28 | 38 |
| 4 | 0 | x | 2 | 32 | | x | x | x | x | | | x | 85 | 115 |
| 5 | 0 | x | 4 | 32 | | x | x | x | x | | | x | 170 | 230 |
| 6 | 0 | x | 4 | 16 | | x | x | x | x | | | x | 340 | 460 |
| 7 | 0 | x | 4 | 8 | | x | | x | x | | | x | 680 | 925 |

FIG. 7

NODE HAVING A MULTI-USER RAKE RECEIVER FOR USE IN A COOPERATIVE BROADCAST MULTI-HOP NETWORK THAT EMPLOYS BROADCAST FLOOD ROUTING AND MULTI-HOP TRANSMISSION WITH COOPERATIVE BEAMFORMING

CROSS-REFERENCE TO RELATED APPLICATION

This application claims the benefit of U.S. Provisional Application No. 62/823,420 filed Mar. 25, 2019.

TECHNICAL FIELD

The present invention generally relates to wireless communication systems, and more particularly relates to a cooperative broadcast multi-hop network that employs broadcast flood routing and multi-hop transmission using a direct-sequence spread-spectrum (DSSS) waveform with cooperative beamforming and adaptive space-spectrum whitening. A node, that is part of the cooperative broadcast multi-hop network, is disclosed. The node includes a multi-user rake receiver that can combine, when performing demodulation processing, transmissions directly received from other nodes and multipath components of transmissions received from the other nodes.

BACKGROUND

In recent years, the U.S. Department of Defense (DOD) has sought to develop RF communications technologies that protect signals from enemy attempts to detect, intercept, or exploit those signals, while still maintaining other desirable attributes and capabilities of the communication systems (e.g., throughput, spectral efficiency, network performance, latency, etc.).

One such example is the U.S. Defense Advanced Research Projects Agency's (DARPA's) Computational Leverage Against Surveillance Systems (CLASS) program that is designed to help safeguard military ground-to-ground, ground-to-air, and air-to-air RF communications. A goal of the DARPA CLASS program is to create new waveforms and technology to protect military RF communications from enemy signals intelligence. The DARPA CLASS program sought to create communications waveforms that capitalize on advanced in digital signal processing to enable future military communications systems to receive and process transmissions using sophisticated application specific integrated circuits (ASICs) while forcing adversaries to require supercomputer processing to intercept and exploit radio signals.

Resilience in electronic warfare (EW) environments is provided through waveform complexity, spatial diversity techniques and interference exploitation. Waveform complexity refers to removing predictable structures from communication waveforms, adding atypical random structure, new ways to acquire and track signals, and similar techniques. Waveform complexity uses advanced communications waveforms that are difficult to recover without knowledge and understanding of the signals itself. Spread-spectrum communications are signal structuring techniques in which telecommunication signals transmitted in a band is considerably larger than the frequency content of the original information. A receiver correlates receive signals to retrieve the original information signal. There are many types of spread-spectrum communication systems including, but not limited to, direct-sequence, frequency hopping, and hybrid variations that combine these techniques. Regardless of the variation, each of these techniques utilizes pseudo-random number sequences to determine and control a spreading pattern of a signal across an allocated bandwidth. Any of these spread-spectrum communication systems can help prevent adversaries from jamming communications and thus provide anti jamming capability. For example, direct-sequence spread-spectrum (DSSS) is employed for low probability of intercept/low probability of detection (LPI/LPD) signaling. In addition, these types of spread-spectrum communication systems, can also be used to hide the fact that communication was even taking place. This is sometimes referred to as low probability of intercept or LPI.

Spatial diversity transmission refers to manipulating the spatial characteristics of a signal to create controlled, recoverable waveforms at the destination receiver while creating difficult-to-recover signal characteristics at other locations. Spatial diversity uses distributed cooperative communications devices and the communication environment to disguise and dynamically vary the apparent location of the signal. When spatial antennas are co-located together (e.g., in a single unit or box), or when the antennas are stationary and connected to a central distribution point, it can be relatively easy to implement transmit spatial diversity. However, in other applications, implementing transmit spatial diversity becomes significantly more challenging. For example, when the transmitters are non-collocated (e.g., separate terminals), dynamically moving, and lack centrally controlled coordination, the coordination required across the devices becomes more challenging. The disclosed embodiments can allow spatial diversity and coherent combining to be employed with reasonable complexity.

Interference exploitation or spectrum obfuscation makes use of the clutter in the signal environment to make it difficult for an adversary to isolate a particular signal. Interference exploitation techniques seek to use natural and artificial interference against an unintended receiver (e.g., to force adversaries to dedicate processing resources to the source signal to reduce interference).

Cooperative broadcast transmitters and receivers are typically complex. Scalability becomes a challenge with dynamic or growing network users. Some of the challenges faced include processing multi-user detection, estimation of channel state information for each received user-channel for beam combining, or coordination of space time block codes.

BRIEF DESCRIPTION OF THE DRAWINGS

The present invention will hereinafter be described in conjunction with the following drawing figures, wherein like numerals denote like elements, FIG. 1A illustrates one example of uplink operation of the communication system and where FIG. 1B illustrates one example of downlink operation of the communication system;

FIG. 7 is a table that shows waveform attributes for a range of modes and throughput options that are supported in accordance with some non-limiting examples of the disclosed embodiments.

DETAILED DESCRIPTION

Figure 1A:
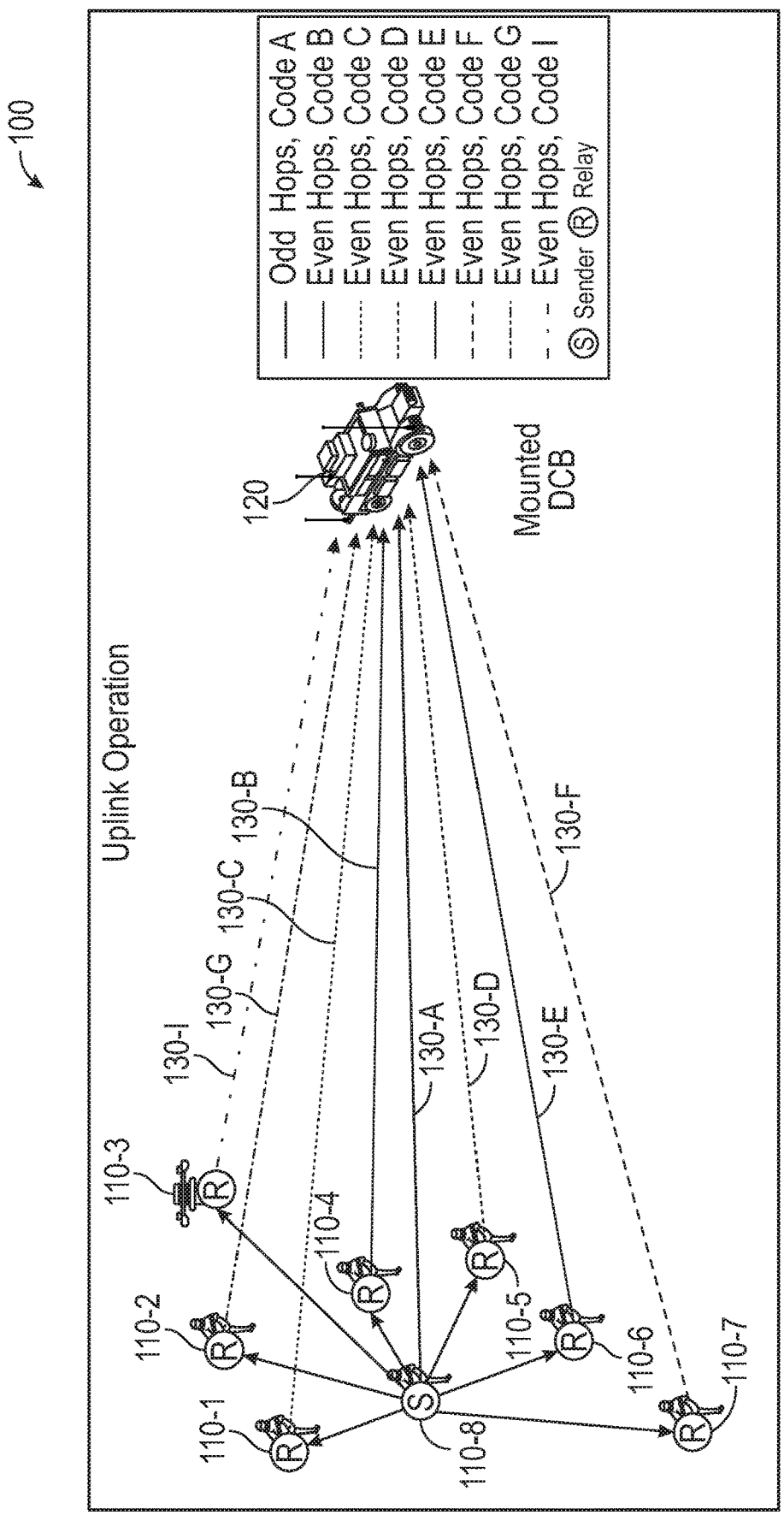
FIGS. 1A and 1B are diagrams of a communication system in accordance with the disclosed embodiments, where

The following detailed description is merely exemplary in nature and is not intended to limit the invention or the application and uses of the invention. Furthermore, there is no intention to be bound by any theory presented in the preceding background or the following detailed description.

The disclosed embodiments relate to a cooperative broadcast, CDMA-based multi-hop network with adaptive, scalable, non-collocated cooperative beamforming techniques, and adaptive space-spectrum whitening. The multi-hop network employs broadcast flood routing and multi-hop transmission. The originator of a communication that is the message source of a broadcast message, also referred to herein as an "originating node" or "source message node," can transmit on odd numbered hop intervals, and any nodes that receive that communication error-free can then serve as relay nodes that retransmit the communication on even numbered hop intervals. A receive node can be either a relay node or listener node. Relay nodes, which received the message on odd hop numbered hop intervals, can re-broadcast or relay the error-free packets on even hop numbered hop intervals. Any nodes that do not receive the original communication error-free are listener nodes, also referred to herein as destination nodes. The listener nodes can receive the communications transmitted by the relay nodes. A listener node receives on even numbered hop intervals during the active message interval. In one implementation, a listener node can do both (e.g., receive on odd numbered hop intervals and on even numbered hop intervals during the active message interval). For larger networks with greater geographic coverage, this process can be extended by repeating the message over additional odd/even hops.

In one embodiment, cooperative beamforming is employed on both uplink and downlink communications. For uplink communications coherent combining is employed. To implement distributed/cooperative beamforming, each node in the network is assigned its own unique scramble code that can be used to identify that node. For instance, each unique scramble code can be a pseudo noise (PN) code that is used to spread a baseband signal over a broader frequency band in accordance with a pseudorandom bit sequence during transmission. The unique scramble codes allow a receiving node to separate and distinguish between individual transmissions that are received from other nodes that are part of the network. In one embodiment, a user or node identifier is determined by its scramble sequence. For example, in one implementation, the scramble code can be a Kasami code that is applied after spreading has occurred using a spreading code, i.e. on a chip basis. This is a unique assignment to each user node and permits a receiver to distinguish between the multiple transmitting nodes. In addition, a random scramble code (e.g. TRANSEC or AES sequence) can also be applied that is common across all nodes and changes on a per hop basis. As such, this random scramble code provides inherent timing information on a hop-by-hop basis. Each node includes a multi-user rake receiver and a beamforming module. Each node can receive transmissions from multiple transmitter nodes (e.g., within the same RAKE reception window), and then implements cooperative beamforming using the received transmissions and each multipath component for each of the received transmissions. In one embodiment, each node employs adaptive space-spectrum whitening for anti jam and interference mitigation.

Prior to describing the disclosed embodiments, a brief summary will be provided to describe modulation and channel access technologies that are used is some embodiments of a cooperative broadcast multi-hop network will now be provided.

Spread-Spectrum

Spread-spectrum modulation techniques have been adopted for many current and future military communication systems to accommodate high data rates with high link integrity, even in the presence of significant multipath effects and interfering signals. In telecommunications, the term "spread-spectrum" is defined as any of a group of modulation techniques or formats in which a radio frequency (RF) bandwidth much greater than necessary is used to transmit an information signal so that a signal-to-interference improvement may be gained. The energy contained in a baseband signal is spread over a broad-band in a pseudo-random manner during transmission and the narrow-band signal is retrieved during reception. The spreading method for spreading a given signal is provided by the modulation scheme that is utilized.

Spread-spectrum transmission offers many advantages over a fixed-frequency transmission. Spread-spectrum signals are highly resistant to narrowband interference. The process of re-collecting a spread signal spreads out the interfering signal, causing it to recede into the background. Spread-spectrum signals are difficult to intercept. A spread-spectrum signal may simply appear as an increase in the background noise to a narrowband receiver. An eavesdropper may have difficulty intercepting a transmission in real time if the pseudorandom sequence is not known. Spread-spectrum transmissions can share a frequency band with many types of conventional transmissions with minimal interference. The spread-spectrum signals add minimal noise to the narrow-frequency communications, and vice versa. As a result, bandwidth can be used more efficiently. Spread-spectrum signals are also highly resistant to deliberate jamming, unless the adversary has knowledge of the spreading characteristics.

Direct-Sequence Spread-Spectrum (DSSS)

DSSS is a form of spread-spectrum modulation used to reduce overall signal interference, where a code sequence is used to directly modulate a carrier. The spreading of this signal makes the resulting wideband channel noisier, allowing for greater resistance to unintentional and intentional interference. To explain further, in DSSS communications, a message signal is used to modulate a bit sequence known as a pseudo noise (PN) code, also called a pseudo-random digital sequence, generated by a pseudo-random code generator. This PN code consists of a radio pulse that is much shorter in duration (larger bandwidth) than the original message signal. In this context, the duration of the radio pulse for the PN code is referred to as the chip duration. The "chip" rate is much higher than the symbol rate of the signal being transmitted. The smaller this duration, the larger the bandwidth of the resulting DSSS signal. For example, a transmitter modulates the carrier with the PN code. Each symbol of the original message signal is individually encoded by multiple chips per symbol (e.g., typically 32 to 512 chips per symbol.) A receiver demodulates the carrier so as to decode the information signal by adjusting the phase of a PN code, generated by a local PN code generator and identical to the transmitted PN code, to correlate (or "synchronize") with the transmitted PN code. For proper despreading of the digital information to occur, the locally generated PN code must exactly align with the transmitted PN code, in particular by taking into account the shift in phase due to delay of reception resulting from the finite speed of electromagnetic wave propagation. This modulation of the message signal scrambles and spreads the pieces of data, and thereby resulting in a bandwidth size nearly identical to that of the PN code.

Code Division Multiple Access (CDMA)

CDMA is a channel access method used by various radio communication technologies. CDMA is an example of multiple access, where several transmitters can send information simultaneously over a single communication channel. This allows several users to share a band of frequencies. To permit this without undue interference between the users, CDMA employs spread-spectrum technology and a special coding scheme where each transmitter is assigned a unique scramble code. Each user in a CDMA system uses a different code to modulate their signal. The best performance occurs when there is good separation between the signal of a desired user and the signals of other users. The separation of the signals is made by correlating the received signal with the locally generated code of the desired user. If the received signal matches the desired user's code, then the correlation function will be high and the system can extract that signal. If the desired user's code has nothing in common with the signal, the cross-correlation should be as close to zero as possible (thus eliminating the signal). If the code is correlated with the signal at any time offset other than zero, the correlation should be as close to zero as possible. This is referred to as auto-correlation and is used to reject multi-path interference.

Frequency Hopping DSSS (FH/DSSS)

The performance of any radio communication system is affected by several factors such as: interference, and jamming caused by some other parallel networks for the purpose of decreasing the performance of a given system. To address these problems, DSSS signaling is combined with the use of coordinated frequency hopping (FH) modulation to provide hybrid spread-spectrum (HSS) transmission scheme. As used herein, the term "hybrid spread-spectrum (HSS)" can refer to a combination of DSSS, for example, code division multiple access (CDMA), and at least one of frequency hopping, time hopping, time division multiple access (TDMA), orthogonal frequency division multiplexing (OFDM) and/or spatial division multiple access (SDMA). DSSS generates a sequence of bits and spreads the spectrum with a PN code or "spreading sequence," while FHSS sends the data into different channels with variable data rates. The hybrid DS/FH approach takes advantage of DSSS and uses it in multiple channels.

In one embodiment, a cooperative broadcast multi-hop network is provided that employs broadcast flood routing and multi-hop transmission using a direct-sequence spread-spectrum (DSSS) waveform. The cooperative broadcast multi-hop network includes a plurality of nodes. In one embodiment, the DSSS waveform can be a frequency-hopping direct-sequence spread-spectrum (FH/DSSS) waveform in which DSSS modulation is combined with frequency hopping (FH) between DSSS channels to provide a hybrid FH/DSSS modulation format. In one implementation, the FH/DSSS waveform has a hop rate and a spreading rate that are adjustable. Each node can transmit transmissions that are modulated using a unique scramble code for that node that identifies transmissions from that node (to distinguish them from transmissions by other nodes) and a common scramble code that is shared with the other nodes. For example, in one embodiment, the unique scramble code is a first code that is unique for that particular node that is logically combined with a security code. In one embodiment, each transmission by a node is a direct-sequence spread-spectrum (DSSS) signal having DSSS waveform. Each of the nodes can broadcast transmissions on a unique channel for that node when transmitting as an original sender of a transmission, and receive transmissions from nodes that are original senders and multipath components thereof on the odd numbered hop intervals. The unique channel for each node is defined by an odd numbered hop interval assigned to that node and the unique scramble code assigned to that node. Each of the nodes can re-transmit, when operating as a relay node, any transmissions that are received error free from other nodes on another unique channel for that node that is defined by an even numbered hop interval assigned to that node and the unique scramble code assigned to that node, and receive re-transmitted transmissions from nodes that are relays and multipath components thereof on the even numbered hop intervals. In one embodiment, each node can include a different interleaver module than the other nodes.

In one embodiment, each of the nodes includes at least one antenna configured to receive a plurality of DSSS signals from other nodes on a particular channel, and output a channel that includes the plurality of DSSS signals. The plurality of DSSS signals can include transmissions that are directly received from other nodes and multi-path components of those transmissions.

In one embodiment, each of the nodes includes a waveform module having a receiver processing chain. Each receiver processing chain can include a multi-user RAKE receiver that can combine, when performing demodulation processing, a plurality of transmissions directly received from other nodes and multipath components of transmissions received from other nodes. In one implementation, each multi-user RAKE receiver can include first and second correlation modules each being configured to receive channelized signals output by an adaptive space-spectrum whitener (ASSW) module, and a finger selection module. Each channelized signal can be a spatial stream. For example, each of the first and second correlation modules can include correlator blocks for each of the plurality of nodes (1, . . . , N). Each correlator block is driven by a unique scramble code that identifies transmissions from a particular node and performs correlation for that particular node by processing a spatial stream received from the ASSW module and the unique scramble code for that particular node to determine channel-multipath correlations and generate one or more candidate fingers multipath location and respective complex weight. Each finger corresponds to a specific channel-signal pair for that particular node or a specific channel-multipath component pair for that particular node. The finger selection module can receive the fingers output from each correlator block and to select a subset (1 . . . F) of the fingers having sufficient correlation by selecting which nodes contribute to the F total largest signal multipath components received.

In one embodiment, a maximum likelihood ratio combiner module is provided that includes a plurality of processing modules and a maximum likelihood ratio combiner module. Each processing module processes signals for that node. Each processing module can include a coherent combine module for that node, a descrambler for that node, and a pilot despreader module for that node. Each coherent combine module can receive a number of the subset of fingers from the finger selection module, and coherently combine that number of the subset of fingers to generate an output signal. Each descrambler can descramble the output signal received from that coherent combine module using a unique descramble code for that node to generate a descrambled signal, and each pilot despreader module can despread the descrambled signal to generate a despread pilot signal.

In one embodiment, the receiver processing chain in each waveform module for each of the nodes can include a maximum likelihood ratio combiner module that includes a coherent combiner module that can coherently combine, using pilot soft-decision bits from each of the despread pilot signals for each node, each of the descrambled signals received across multiple nodes to generate a coherently constructed signal of spread data channels that comprise a coherently combined vector of chips of information.

In one embodiment, the receiver processing chain in each waveform module for each of the nodes can include a data despreader module and a gather, de-interleave and decoder block. Each data despreader module can despread and convert the chips from the respective data channels to generate demodulated data symbols that are converted into data soft-decision bits. Each gather, de-interleave and decoder block can include a gather block configured to concatenate the data soft-decision bits from each hop across multiple received hops together to form codeword soft-decision bits; a de-interleaver block configured to de-interleave the codeword soft-decision bits; and a decoder block configured to perform low density parity check (LDPC) forward error correction (FEC) decoding and broadcast decoding on the codeword soft-decision bits to recover information bits corresponding to the complete codeword.

In one embodiment, the receiver processing chain in each waveform module for each of the nodes can include a maximum likelihood ratio combiner module that can maximally ratio combine aligned symbols for each of a subset $(1 \ldots F)$ of the fingers on a per channel basis to generate a soft decision across each of the multiple channels, and combine the soft decisions into a joint soft decision.

In one embodiment, the antenna is a first antenna, and one or more of the plurality of nodes can include a second antenna configured to receive a second plurality of DSSS signals from other nodes on a second particular channel, and output a second channel that includes the second plurality of DSSS signals, wherein the second plurality of DSSS signals include transmissions that are directly received from other nodes and multi-path components of those transmissions.

In one embodiment, the receiver processing chain of each node further can include a de-hop module and an adaptive space-spectrum whitener (ASSW) module. Each de-hop module can de-hop each of the received DSSS signals by tuning to a particular frequency to receive each DSSS signal and then channelizing input spectrum for each of the received DSSS signals to generate beam samples for that channelized signal. Each ASSW module can perform adaptive space-spectrum whitening to detect and remove interference signals received from each of, for example, the first and second channels by preforming a covariance analysis to generate a first channelized signal that comprises transformed beam samples for the first channel and a second channelized signal that comprises transformed beam samples for the second channel. Each ASSW module can output the first and second channelized signals to first and second correlation modules of the multi-user RAKE receiver of that dismount node.

In one embodiment, each ASSW module can include a modified Discrete Fourier Transform (MDFT) analysis module, an adaptive interference mitigation space-frequency whitener module, and a MDFT synthesis module.

Each modified Discrete Fourier Transform (MDFT) analysis module can include a plurality of an MDFT analysis banks. Each MDTF analysis bank corresponds to an antenna and can receive a beam from an antenna in the spectral domain and channelize the beam to generate a channelized beam of frequency samples. Each beam comprises a digitized spatial stream of frequency channelized RF samples that are digitized to preserve spatial diversity. Each channelized beam comprises multiple spectral channels. The channelized beams collectively comprise a number of spectral-spatial channels equal to the product of the number of channelized beams and the multiple spectral channels. The channelized beams collectively form a spatial-spectral matrix (Z) of time-frequency samples across the different antennas. The adaptive interference mitigation space-frequency whitener module can apply a whitening matrix (W) to the spatial-spectral matrix (Z) to remove interference and generate an interference-mitigated whitened matrix (WZ) that comprises a plurality of interference-mitigated spatial-spectral domain channels. Each MDFT synthesis module can include a plurality of MDFT synthesis banks that collectively re-construct the interference-mitigated whitened matrix (WZ) back to a time-domain matrix (Y) that comprises interference mitigated time-domain channelized signals. Each MDFT synthesis bank is configured to perform a MDFT synthesis operation on one of the spatial-spectral domain channels to generate an interference mitigated time-domain channelized signal of reconstructed beam samples. Each interference mitigated time-domain channelized signal represents a respective spatial channel. Each row of the spatial-spectral matrix (Z) represents spatial-spectral samples unique to one of the channelized beams, and each column of the spatial-spectral matrix (Z) represents time indices. In one embodiment, the adaptive interference mitigation space-frequency whitener module calculates auto-correlation matrices across rows of the spatial-spectral matrix (Z) such that the resulting whitened matrix (WZ) is a diagonal correlation matrix.

In one embodiment, each waveform module can include a maximum likelihood ratio combiner module that along with the multi-user RAKE receiver collectively provides a multi-channel beamformer module. The multi-channel beamformer module can perform cooperative beamforming on a per channel basis by processing the time-domain matrix (Y) and coherently combine a subset of transmissions and multipath components for each transmission that are received from other nodes together. The subset of transmissions and multipath components are those having signal strength greater than or equal to a threshold. In this embodiment, coherently combining is accomplished by time aligning the respective signals of interest, and removing frequency offset and phase offset from each transmission.

In one embodiment, the multi-channel beamformer module is configured to: receive the interference mitigated time-domain channelized signals from each MDFT synthesis bank; derive a joint code-based-beamforming matrix (B)

across all detected interference mitigated time-domain channelized signals; apply the joint code-based-beamforming matrix to the time-domain matrix to beam combine the interference mitigated time-domain channelized signals; and select a sub-set of the interference mitigated time-domain channelized signals to generate a beam combined signal.

In one embodiment, at least one of the plurality of nodes further can include a third antenna and a fourth antenna. The first, second, third and fourth antennas are part of a multi-band phased antenna array having a number (N) of antennas that include the first, second, third and fourth antennas. In one implementation, the third antenna can receive a third plurality of DSSS signals from other nodes on a third particular channel, and output a third channel that includes the third plurality of DSSS signals. The fourth antenna can receive a fourth plurality of DSSS signals from other nodes on a fourth particular channel, and output a fourth channel that includes the fourth plurality of DSSS signals. The third and fourth plurality of DSSS signals each include transmissions that are directly received from other nodes and multi-path components of those transmissions. In this embodiment, the receiver processing chain of the waveform module further can include a space-time receive code-based beamforming module that includes a multi-channel beamformer module, a multi-user RAKE receiver and a maximum likelihood ratio combiner module. The multi-channel beamformer module can perform adaptive beamforming on a per channel basis. In one embodiment, the multi-channel beamformer module performs a matrix operation that linearly transforms interference mitigated time-domain channelized signals to coherently combine the interference mitigated time-domain channelized signals into a smaller number ($N_T$) of directional beams. The multi-user RAKE receiver can process each of the directional beams output by the multi-channel beamformer module and align symbols using scramble code correlation. In one implementation, the multi-channel beamformer module can receive the interference mitigated time-domain channelized signals from each MDFT synthesis bank; derive a joint code-based-beamforming matrix (B) across all detected interference mitigated time-domain channelized signals; apply the joint code-based-beamforming matrix to the time-domain matrix to beam combine the interference mitigated time-domain channelized signals; and select a sub-set of the interference mitigated time-domain channelized signals to generate a beam combined signal. The transmissions received across each of the number (N) of antennas of the multi-band antenna array are coherently combined on a per channel basis to generate a corresponding directional beam. Each directional beam can cover a portion of an azimuth range.

In one embodiment, each of the nodes includes a power control module that is configured to: encode originating transmit power in a message to support adaptive power control and encode channel status information in the message so that channel status of the cooperative broadcast multi-hop network is propagated to each of the other nodes. Each node, when transmitting as an original sender of a transmission, can broadcast a particular message on odd numbered hop intervals to propagate the originating transmit power channel status information to other nodes in the cooperative broadcast multi-hop network. In one implementation, the particular message can be a push-to-talk (PTT) message or a synchronization message that is regularly broadcast a synchronization channel (used to maintain time synchronization relative to a master node so that transmissions of the nodes are synchronized to arrive within the same reception window of the multi-user RAKE receiver). Each node that receives the particular message can process the channel status information to estimate a receive signal-to-noise (SNR); determine, based on the estimated receive SNR and the originating transmit power, whether transmit power of that node should be adjusted before transmitting or relaying a message; and when it is determined that transmit power of that node is to be adjusted: adjust current transmit power of that node; and re-transmit messaging including current transmit power on even numbered hop intervals.

In one embodiment, each node can include a beamformer and hop assignment module that includes a beamformer module and a hop assignment module. The hop assignment module includes a Fast-Frequency Hopping (FFH) transmitter that is configured to assign a hop number for transmissions by that node, where a hop number is a function of time, and a hop frequency is based on pseudo-random sequence. The beamformer module can update amplitude and phase weightings of a DSSS signal that is provided to the two or more antennas.

Figure 1B:
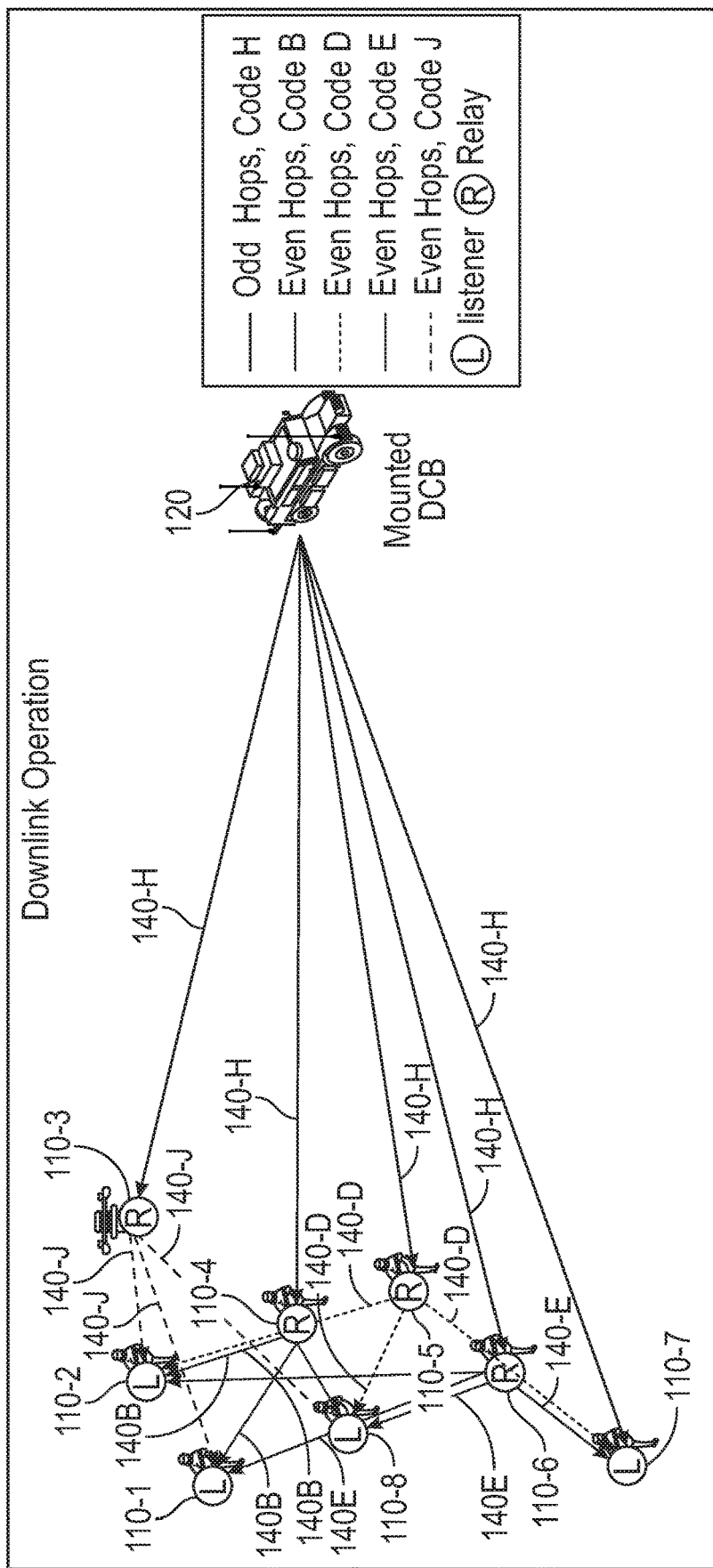

Having given this overview a communication system in accordance with the disclosed embodiments will now be described with reference to FIGS. 1A and 1B. FIGS. 1A and 1B are diagrams of a communication system 100 in accordance with the disclosed embodiments. The communication system 100 can also be referred to as a squad local area network. The communication system 100 includes a plurality of dismount nodes 110-1 . . . 110-8 and at least one mounted node 120, which can also be referred to herein as a mounted destination node or mounted listener node. In this non-limiting embodiment, dismount nodes 110-1, 110-2, 110-4, 110-5, 110-6, 110-7, 110-8 are carried by ground personnel, while dismount node 110-3 is mounted on a drone or other airborne machine to enable range extension and provide enhanced coverage (e.g., reliable coverage within challenging terrain and foliage), whereas the mounted node 120 is mounted on a ground vehicle. Given the small size and low power of the dismount nodes, a dismount node 110-3 can be hosted on a drone to provide one or more aerial relay nodes, dramatically improving link performance. The mounted node 120 (with more antennas and more processing) extends the range of a protected Low Probability of Intercept/Low Probability of Detection (LPI/LPD) waveform without increasing the transmitted power of the dismount nodes 110-1 . . . 110-8, while maintaining LPI/LPD performance.

The various nodes 110, 120 communicate with each other using the protected LPI/LPD waveform to provide scalable anti-jam, LPI/LPD and throughput. The protected LPI/LPD waveform is also designed to allow for long battery life. In one embodiment, the LPI/LPD waveform is a direct-sequence spread-spectrum (DSSS) waveform that utilizes a DSSS modulation format. In another embodiment, DSSS modulation is combined with frequency hopping (FH) between DSSS channels to provide a hybrid frequency-hopping direct-sequence spread-spectrum (FH/DSSS) waveform having a FH/DSSS modulation format. The FH/DSSS waveform has a hop rate and a spreading rate that are adjustable. FH is power efficient method to achieve a high detection ratio, and also allows for a selectable hop rate to optimize LPD detection ratio, or throughput with single carrier operation. In one embodiment, the FH/DSSS waveform combines hybrid FH/DSSS with CDMA to provide an odd/even numbered hop interval cooperative broadcast, multi-hop flooding network in a manner that allows for diversity gains approaching coherent transmit beamforming. FH can be used as the multiple access method in a CDMA scheme to provide frequency hopping-code division multiple access (FH-CDMA). In another embodiment, time hopping is also used with and without frequency hopping so that the interval between transmissions is pseudo randomly changed.

This frequency-hopping direct-sequence spread-spectrum scheme can help provide frequency diversity and allows the data transmission to better withstand deleterious path effects such as narrow-band interference, jamming, fading, and so on, while also reducing multipath interference. Each available frequency band is divided into sub-frequencies. Data is transmitted on different frequency sub-bands or sub-carriers in different time intervals, which are also referred to as "hop periods," where the data transmission rapidly changes ("hops") among these frequency sub-bands in a predetermined order (i.e., the data transmission hops from sub-band to sub-band in a pseudo-random manner). In other words, the radio signals are transmitted by rapidly switching a carrier among many frequency channels, using a pseudo-random sequence known to both transmitter and receiver. When the hopping patterns are chosen carefully, adjacent channel interference can also be minimized. A signaling channel is used to assign frequency hopping patterns to active user-pairs to avoid co-channel interference. This enables the assigned frequency band to be fully utilized.

In one embodiment, a CDMA-based cooperative broadcast multi-hop network can be provided in which dismount nodes can receive downlink transmissions from multiple of the other nodes on separate CDMA channels, and mounted node(s) can receive uplink transmissions from at least some of the dismount nodes on separate CDMA channels. The CDMA waveform allows for robust beamform combining through use of separate CDMA "channels" for each user with continuous link-channel information on all connections. As will be described below, beamforming can be implemented on a per link basis (e.g., versus aggregate basis).

Each node 110, 120 is assigned its own scramble code for generating communications sent to other nodes 110, 120. The multiple-access communication system can simultaneously support communication for multiple nodes. Each dismount node 110-1, 110-2, 110-3, 110-4, 110-5, 110-6, 110-7, 110-8 is capable of communicating with other dismount nodes via relay links, and is capable of communicating with at least one mounted node 120 via transmissions on uplinks 130 and downlink 140-H. The downlink (or forward link) refers to the communication link from the mounted node 120 to the dismount nodes 110-1, 110-2, 110-3, 110-4, 110-5, 110-6, 110-7, 110-8, and the uplink (or reverse link) refers to the communication link from the dismount nodes 110-1, 110-2, 110-3, 110-4, 110-5, 110-6, 110-7, 110-8 to the mounted node 120. As will now be explained, an odd/even numbered hop interval broadcast flood routing protocol helps ensure highly reliable message delivery and minimizes spectrum usage.

Uplink Communications By Dismount Nodes: Sender Dismount Node and Relay Dismount Nodes During uplink operation, one of the dismount nodes acts as a sender dismount node (i.e., the node that is the originator of the uplink communication that is intended for the mounted node 120). The sender dismount node transmits an uplink communication on odd numbered hop intervals. All of the other dismount nodes can act as relay dismount nodes, where each relay dismount node, that receives the uplink communication (error free) from the sender dismount node, attempts to relay that uplink communication to the mounted node 120 on even numbered hop intervals.

FIG. 1A illustrates one example of uplink operation of the communication system 100 of the communication system 100 in accordance with the disclosed embodiments. As will be explained in greater detail below, when operating as a sender/originator of an uplink communication, each dismount node 110-1, 110-2, 110-3, 110-4, 110-5, 110-6, 110-7, 110-8 can communicate (transmit) their uplink communications to the mounted node 120 (and other dismount nodes) on odd numbered hop intervals (or "odd frequency hops"). By contrast, when operating as a relay, each dismount node 110-1, 110-2, 110-3, 110-4, 110-5, 110-6, 110-7, 110-8 can relay or re-transmit uplink communications (received from a sender dismount node) to the mounted node 120 on even numbered hop intervals (or "even frequency hops"). In other words, these re-transmissions for flood routing occur on even numbered hop intervals. By isolating the original transmission on odd numbered hop intervals and re-transmissions on even numbered hop intervals, this prevents "message blow back" (e.g., the originating transmitter (sender node) and relay nodes do not receive re-transmissions). This reduces complexity and network self-induced noise.

In this example, during uplink operation odd-even numbered hop interval flood routing is observed, and the sender dismount node 110-8 broadcasts a communication/message on odd numbered hop intervals over a channel 130-A using a shared Transmission Security Key (TRANSEC) scramble code that the sender and receiver share in advance and a unique scramble code A that identifies the sender dismount node 110-8 and can thus be used by other nodes to distinguish transmissions from the sender dismount node 110-8. The communication/message from the sender dismount node 110-8 can potentially be received by one or more of the various relay dismount nodes 110-1 . . . 110-7 and the mounted node 120.

Each of relay dismount nodes 110-1 . . . 110-7 can function as a relay node that relays the communication/message from sender dismount node 110-8 back towards the mounted node 120 using its own unique channel that is defined by a hop assignment (even numbered hop intervals) and a unique scramble code for that relay dismount node 110-1 . . . 110-7. In one embodiment, each of the dismount nodes 110-1 . . . 110-7 that receive a code word error free can re-broadcast the code word on even numbered hop intervals, with each device/node 110 using their unique scramble code assignment along with a common shared spreading code. Relay dismount nodes that did not receive the code word error free and the sender dismount node 110-8, listen to these even numbered hop intervals. As used herein, the term "code word" can refer to an element of a standardized code or protocol. Each code word is assembled in accordance with the specific rules of the code and assigned a unique meaning.

For example, in this non-limiting example, relay dismount node 110-1 relays the communication/message over a channel 130-C on even numbered hop intervals using scramble code C, relay dismount node 110-2 relays the communication/message over a channel 130-G on even numbered hop intervals using scramble code G, relay dismount node 110-3 relays the communication/message over a channel 130-I on even numbered hop intervals using scramble code I, relay dismount node 110-4 relays the communication/message over a channel 130-B on even numbered hop intervals using scramble code B, relay dismount node 110-5 relays the communication/message over a channel 130-D on even numbered hop intervals using scramble code D, relay dismount node 110-6 relays the communication/message over a channel 130-E on even numbered hop intervals using scramble code E, and relay dismount node 110-7 relays the communication/message over a channel 130-F on even numbered hop intervals using scramble code F.

As will be described in greater detail below, all nodes 110, 120 can perform adaptive space-spectrum whitening (ASSW) via an ASSW module as an effective, robust measure that effectively mitigates interference and jamming. The ASSW technology will be described below with reference to FIG. 6. In addition, each node (e.g., dismount and mounted nodes) can coherently combine (or beamform) all the received links. For instance, in this example, the mounted node 120 can receive (via a RAKE receiver) at least some of the communications/messages from the sender dismount node 110-8 and the various relay dismount nodes 110-1 . . . 110-7 and perform beamforming for each hop-code pair. As will also be described in greater detail below, the mounted node 120 has more antennas and more signal processing capability than the dismount nodes 110. In one embodiment, dismount nodes 110 employ two receiver antenna elements and process a small subset of all available DSSS signals, whereas the mounted node 120 has extra processing capability and supports four or more antennas. The extra processing capability of the mounted node 120 enables it to combine and process DSSS signals received from all of the dismount nodes 110 and to perform adaptive beamforming across four antennas individually for each link. As such, the multi-beam mounted node 120 can adaptively combine radio (DSSS) signals received from each dismount node 110 to achieve a distributed cooperative beamforming processing gain. Likewise, each dismount node 110 can also adaptively combine radio signals received from each node to achieve a distributed cooperative beamforming processing gain.

Downlink Operation: Downlink Communications from Mounted Node to Dismount Nodes

During downlink operation of the communication system 100, the mounted node 120 can broadcast downlink communications to each of the dismount nodes 110-1, 110-2, 110-3, 110-4, 110-5, 110-6, 110-7, 110-8 on odd numbered hop intervals. In other words, the mounted node 120 transmits on odd hops when it is the originator of a network transmission.

In some cases all of the dismount nodes 110 may not receive the downlink communication directly. As such, each dismount node that receives the downlink communication "error free" can re-broadcast (or relay) those downlink communications to the other dismount nodes on even numbered hop intervals. Thus, depending on whether a dismount receives the downlink communication directly from the mounted node 120, or via relay from one of the other dismount nodes, a particular dismount node could receive on odd numbered hops when downlink communications are directly from the mounted node 120, or on even numbered hop intervals for messages relayed from other dismount nodes.

To differentiate between these dismount nodes herein, dismount nodes can fall into one of two groups. Dismount nodes can be "relay dismount nodes" when they directly receive downlink communications (on odd numbered hop intervals) from the mounted node 120, and then relay those downlink communications to other dismount nodes (on even numbered hop intervals). By contrast, "listener dismount nodes" refer to dismount nodes that were unable to directly receive error-free downlink communications from the mounted node 120. These listener dismount nodes can receive downlink communications on even numbered hop intervals from the relay dismount nodes.

In some scenarios, there are two or more mounted nodes 120 to increase link robustness and reliability as well as enabling more flexibility in network operation by having multiple mounted radios in the formation. When there are two or more mounted nodes 120, the ones of the mounted nodes that are not the source or originator of the broadcast message can also act as relays and rebroadcast the downlink communication on even hops. When a mounted node 120 operates as a relay (e.g., is not the originator of the downlink communication), the mounted node 120 transmits or "repeats" any messages, that are received error free, on even numbered hop intervals.

FIG. 1B illustrates an example of downlink operation of the communication system 100 in accordance with the disclosed embodiments. During downlink operation, the mounted node 120 can communicate a communication/message over a channel 140-H on odd numbered hop intervals using a scramble code H. The communication/message from the mounted node 120 can be received by one or more of the various dismount nodes 110-1 . . . 110-8. Each of the dismount nodes 110-1 . . . 110-8 that receives the code word for the mounted node 120 error free can rebroadcast or retransmit the communication/message on even numbered hop intervals. Dismount nodes process the signal received from the mounted node 120 along with any rebroadcasts received from other dismount nodes.

In this non-limiting example shown in FIG. 1B, some of the dismount nodes 110-3 . . . 110-6 function as relay nodes that relay the communication/message from the mounted node 120 towards the other dismount nodes 110-1, 110-2, 110-7, 110-8 using its own unique channel that is defined by a hop assignment (even numbered hop intervals) and a unique scramble code assigned to the relay dismount node 110-3 . . . 110-6. The other dismount nodes 110-1, 110-2, 110-7, 110-8 function as listener dismount nodes that can receive the communication/message from one or more of the mounted node 120 and the relay dismount nodes 110-3 . . . 110-6. For example, in this non-limiting example, relay dismount node 110-3 relays the communication/message from the mounted node 120 toward the listener dismount nodes 110-1, 110-2, 110-8 over a channel 140-J on even numbered hop intervals using scramble code J. Similarly, relay dismount node 110-4 relays the communication/message from the mounted node 120 toward the listener dismount nodes 110-1, 110-2, 110-8 over a channel 140-B on even numbered hop intervals using scramble code B; relay dismount node 110-5 relays the communication/message from the mounted node 120 toward the listener dismount nodes 110-2, 110-8, 110-7 over a channel 140-D on even numbered hop intervals using scramble code D; and relay dismount node 110-6 relays the communication/message from the mounted node 120 toward the listener dismount nodes 110-1, 110-2, 110-7, 110-8 over a channel 140-E on even numbered hop intervals using scramble code E.

Each of the listener dismount nodes 110-1, 110-2, 110-7 110-8 can potentially receive (via a RAKE receiver) at least some of the communications from the mounted node 120 and one or more of the relay dismount nodes 110-3 . . . 110-6 and perform beamforming across the set of received rebroadcasts from the viable network relay nodes.

Waveform Characteristics

In one embodiment, the nodes 110, 120 communicate using a multi-dimensional FH/DSSS waveform that is robust, jam-resistant, and contention-free. In one implementation, to help facilitate low probability of intercept/low probability of detection (LPI/LPD) signaling, a hybrid FH/DSSS waveform is used, hopping at a hop rate (kilohops/second) and simultaneously spreading at a certain chip rate (megachips/second). As will be described below with reference to FIG. 8, the hop rate and spreading rate of the FH/DSSS waveform can be selected to depending on the implementation (e.g., up to 10,000 hops/sec (10 kilohops/second) and 2.5 megachips/second in one implementation). The highest hop rate at sufficient bandwidths can help achieve maximum LPI/LPD and anti-jamming (AJ) performance; however, this comes at the cost of an increased RF signature. On the other hand, lower hop rates can help achieve optimal LPI/LPD modes that permit reduced RF emission with associated improved receiver performance.

As will be described below with reference to FIG. 8, the nodes 110, 120 can operate in any frequency band used for commercial radio communication. Higher frequencies are preferred due to spectrum availability, suitability to smaller sized dismount and mounted antenna, and higher propagation loss desirable for LPI/LPD. For example, in one implementation, the nodes 110, 120 operate in a portion NATO Band III, 1780 MHz to 2680 MHz, which includes the 2.4 GHz ISM band.

The information rates supported by the FH/DSSS waveform can vary depending on the implementation. In one non-limiting implementation, the FH/DSSS waveform supports information rates in the range of 7 kilobytes to 925 kilobytes through flexible Forward Error Correction (FEC) and structure afforded by DSSS codes. This can support high-quality Push-to-Talk (PTT) voice, text, and data traffic such as situational awareness, Position Location Information (PLI), and still images. The FH/DSSS waveform is scalable such that it can support even higher information rates (e.g., information rates required for more bandwidth intensive applications such as full motion video).

To maximize battery life, the FH/DSSS waveform used by the dismount nodes 110 allows "sleeping," which is contrary to classic military waveforms that normally work in continuous receive mode. This can help reduce the size of the batteries used in the dismount notes 110 and make them significantly smaller while also allowing the batteries to last significantly longer while also reducing power dissipation, which in turn enables a small form factor to dissipate self-generated heat.

Distributed Beamforming

A combination of technologies enable implementation of distributed beamforming at the nodes 110, 120. It is desirable to minimize any exposed RF signature. Employing active beamforming at the nodes 110, 120 improves the communications link performance relative to a threat receiver node. A receiver node is a friendly in-network node, whereas a threat receiver node can be any adversarial electronic warfare (EW) receiver that is not part of the network. To implement distributed beamforming at the nodes 110, 120, the system 100 can employ a DSSS-based cooperative broadcast, multi-hop network, and adaptive spatial-spectrum whitening (ASSW). Beamforming can be performed with respect to both the transmit and receive communications. ASSW helps ensure successful signal demodulation when exploiting interference or during electronic warfare, e.g. jamming.

Each dismount node 110 and each mounted node 120 performs adaptive beamforming across all viable received node transmissions and their multi-path components. As will be explained below, each node includes a receiver that employs a multi-user RAKE (mRAKE) receiver to help improve performance in dispersive channels and multi-path environments by performing adaptive, maximal ratio combining (MRC) across the received signals. This approach enables implementing adaptive beamforming for each received dismount node 110 and their respective multi-path component. This provides superior results, for example, when the angular spread of the dismounts is large, or when operating in a high multipath environment. This approach also permits a single network to have multiple mounted nodes 120, versus a single mounted node 120, dramatically improving robustness, reliability, and range. Use of CDMA permits space-time combining and reduces complexity. It also enables operation at higher frequencies in dispersive channels. In addition, the use of CDMA as a channel access method permits optimized processing of each node's link while maintaining cooperative beamforming gain through maximal ratio combining. Furthermore, the use of CDMA as a channel access method permits network wide visibility to link status while enabling adaptive power control and network optimization.

When CDMA is combined with a cooperative broadcast, multi-hop network (discussed below), the link status availability of all nodes is provided via a synchronization channel (e.g., at half the hop rate) to support adaptive power control and maintain time synchronization between nodes. To explain further, the synchronization channel sends information to help ensure and maintain time synchronization across all network nodes. In addition, the synchronization channel can also communicate link status parameters such as transmit power (e.g., useful for power control). As noted above, the system 100 can employ a transmission scheme where the originator of a communication communicates on odd numbered hop intervals, and where the communication is relayed on even numbered hop intervals (or vice versa). This transmission scheme can provide the resiliency of "mesh" operation without the complexity. In other words, the system 100 has a "mesh-like" architecture employing cooperative broadcast, CDMA, multi-hop delivery network to provide the resiliency of mesh and the diversity gains of beamforming, but without the impractical complexity requirements. For example, the cooperative broadcast, multi-hop network does not require each node to function as a router, which eliminates the need for routing, monitoring mobility patterns of nodes and performing route calculations). In accordance with the cooperative broadcast, multi-hop network, the dismount node 110 originates transmission of a message by broadcasting on odd numbered hop intervals. Other dismount nodes 110 that receive the message error free, can then rebroadcast the message on even numbered hop intervals. By contrast, dismount nodes 110, that are not receiving the source node's transmission error free, can listen to even numbered hop intervals and combine both signals to retrieve the message. CDMA coding allows a receiver to use different spreading and scrambling codes to separate individual transmissions of each node. This eliminates the need for complex routing algorithms. Each node 110 can broadcast link performance metrics on a regular basis for the nodes 110 that they are receiving signals from and processing. This way, link status of the radio network is propagated to each of the other nodes of the cooperative broadcast multi-hop network to support adaptive power control required and help achieve LPD enhancement.

As will be described in greater detail below, the combined FH/DSSS waveform-network design can provide diversity performance gains across three dimensions: frequency diversity (e.g., through both frequency hopping and spread-spectrum), time diversity (e.g., leveraged through capacity achieving codes and concepts from space-time block coding), and spatial diversity (e.g., benefits and reliability similar to beamforming, but without the complexity and signaling overhead required for coordination mandated by non-collocated beamforming and combining).

Figure 2:
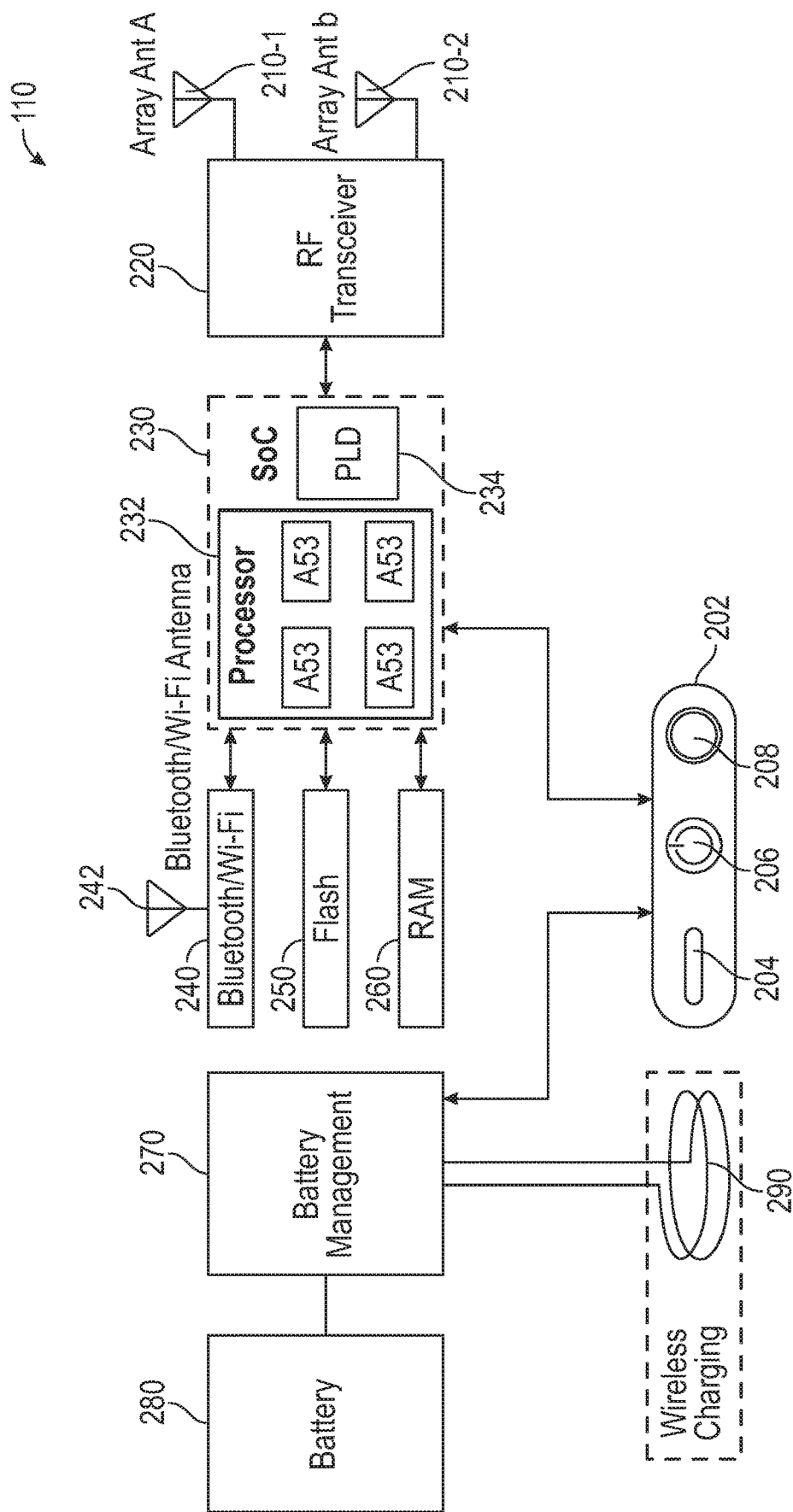
FIG. 2 is a block diagram of a dismount node in accordance with the disclosed embodiments.

FIG. 2 is an exemplary functional block diagram of a dismount node 110 in accordance with the disclosed embodiments. The dismount node 110 includes a housing 202 that encloses or houses various hardware components of the dismount node 110, including an antenna array 210, a RF transceiver 220, a processor unit 230, a Bluetooth/WLAN interface 240, a Bluetooth/WLAN antenna 242, memory including a flash memory module 250 and a RAM module 260, a battery management system 270, a battery 280, and a wireless charging module 290. The housing 202 also has a USB connector 204, an on/off button 206, and a multi-colored LED 208. Although not illustrated, the dismount node 110 can also include a user interface (e.g., a microphone, a speaker and optionally a keypad, a display or any other element or component that conveys information to a user of the dismount node 110 and/or receives input from the user).

In this embodiment, the antenna array 210 includes a pair of antennas 210-1, 210-2 that will be described in greater detail below. It should be appreciated that in other implementations, the dismount node 110 may also include additional antennas. The dismount node 110 allows for inter-squad PTT voice and data communications among squad members over short-range using the FH/DSSS waveform that enables the hardware to be in a low power idle state much of the time to help improve battery life. The dismount node 110 allows for an extended reach-back range to the mounted node 120 using cooperative beamforming.

The RF transceiver 220 is electrically coupled to the antenna array 210. The RF transceiver 220 includes a transmitter (not illustrated) and a receiver (not illustrated) to allow transmission and reception of data between the dismount node 110 and other dismount nodes and the mounted nodes 120. In one embodiment, the RF transceiver 220 can be implemented using an RF Agile transceiver that combines many external RF elements such as ADC, DACs, DCXOs, mixers, and amplifier stages into a single chip. It should be appreciated that in other implementations, the dismount node 110 may also include (not shown) multiple transmitters, multiple receivers, and/or multiple transceivers.

The processor unit 230 controls operation of the dismount node 110. The processor unit 230 may also be referred to as a central processing unit (CPU). The processor unit 230 may comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In one embodiment, the processor unit 230 includes a processor 232 and a programmable logic device 234 (e.g., a flash-based programmable logic device) or other electronic components used to build reconfigurable digital circuits. In one non-limiting embodiment, to help achieve power and space savings, the processor unit 230 can be implemented using a System on Chip (SoC) device that incorporates an ultra-low power micro-controller and a multi-core applications processor, along with the programmable logic device 234 in a compact package. The micro-controller is responsible for the dismount node's Human-to-Machine (HMI) interface. In one implementation, the micro-controller interfaces to a smartphone application. The micro-controller can detect and quantify the level of signals received by the RF transceiver 220. For example, the microcontroller can detect such signals as total energy, energy per subcarrier per symbol, power spectral density and other signals. In one implementation, the micro-controller monitors the RF RSSI. The multi-core applications processor can perform all upper and physical layer waveform processing. Each core of the multi-core applications processor also operates a very low power levels during PTT voice/data mode. Because application processors can efficiently process waveform data, this reduces the element size of the programmable logic device 234, which equates to lower power requirements. In one embodiment, the multi-core applications processor can be implemented using an ARM Cortex-A53 processor, and the micro-controller can be implemented using an ARM M4 core that consumes very low levels of power. The ARM Cortex-A53 processor, designed by ARM Holdings, is a low-power superscalar processor that implements the ARMv8-A 64-bit instruction set. The programmable logic device 234 provides timing control, a portion of the RF data processing, and physical interfaces between the application processor and the RF transceiver 220.

The dismount node 110 can include memory that can provide instructions and data to the processor unit 230. Memory can include both read-only memory (ROM), random access memory (RAM), and non-volatile random access memory (NVRAM). In the particular embodiment illustrated in FIG. 2, the memory includes the flash memory module 250 (or other non-volatile computer storage medium that can be electrically erased and reprogrammed, while retaining data in the absence of a power supply), and the RAM module 260.

The processor unit 230 typically performs logical and arithmetic operations based on program instructions stored within the memory. The instructions in the memory can be executable to implement the methods described herein. A computer program product in accordance with an embodiment includes a computer usable storage medium (e.g., memory) having computer-readable program code (e.g., program instructions) embodied therein, wherein the computer-readable program code is adapted to be executed by one or more processors (e.g., working in connection with an operating system) to implement any methods described herein. In this regard, the program code (e.g., program instructions) may be implemented in any desired language, and may be implemented as machine code, assembly code, byte code, interpretable source code or the like (e.g., via C, C++, Java, Actionscript, Objective-C, Javascript, CSS, XML, and/or others).

The processing unit 230 may also include machine-readable media for storing software. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein.

The Bluetooth/WLAN interface 240 includes at least one Bluetooth module that includes one or more WPAN transceivers or Bluetooth transceivers that are configured to connect node to personal area networks, such as a Bluetooth networks. The Bluetooth/WLAN interface 240 includes at least one WLAN module that includes one or more WLAN transceivers, such as WiFi transceivers, that are configured to connect the node 110 to local area networks, such as WiFi networks. The Bluetooth/WLAN antenna 242 receives Bluetooth and WLAN signals, and transmits Bluetooth and WLAN signals from the node 110. The dismount node 110 can be wirelessly paired with a smart device (e.g., cellular telephone) via its Bluetooth module.

The dismount node 110 has no physical external connectors, using only wireless interfaces for data, voice, control, and charging. The wireless charging module 290 can eliminate the need for external charging. Energy is sent through an inductive coupling to transfer energy through electromagnetic induction and charge the battery 280. The battery 280 is a lightweight, high-capacity battery. Battery life depends on many elements that must work together to limit the use of available energy sources. To help optimize battery life, high-capacity batteries 280 are utilized, and the FH/DSSS waveform is designed to keep the active elements off or idle as much as possible, while hardware is designed to idle at the lowest energy consuming point possible. The battery management system 270 manages the battery 280 by protecting the battery from operating outside its safe operating area, monitoring its state, etc.

Figure 3A:
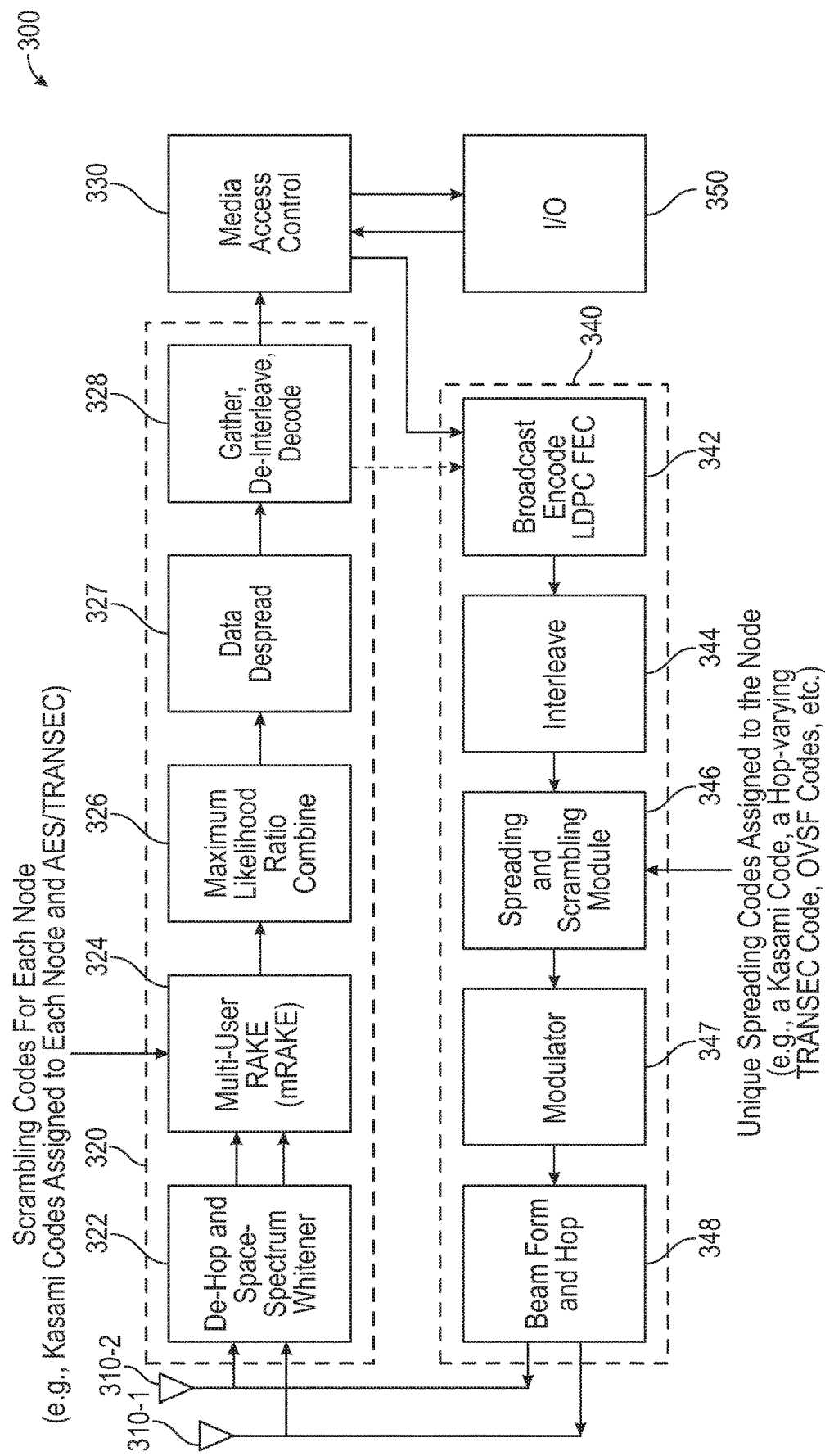
FIG. 3A is a block diagram of a software-defined waveform module of a dismount node in accordance with the disclosed embodiments.

FIG. 3A is a block diagram of a software-defined waveform module 300 of a dismount node 110 in accordance with the disclosed embodiments. The software-defined waveform module 300 may also be referred to as a software-defined hybrid FH/DSSS transceiver module. The software-defined waveform module 300 includes an antenna array 310, a receiver processing chain 320 that defines a receiver path, a transmitter processing chain 340 (also referred to herein as "transmitter") that defines a transmission path, a media access controller (MAC) module 330, and input/output (I/O) interface 350. The software-defined waveform module 300 is a software-defined radio (SDR) where many of the components that have been traditionally implemented in hardware (e.g. mixers, filters, amplifiers, modulators/demodulators, detectors, etc.) are implemented by means of software on a computer or embedded system. Significant amounts of signal processing are handled by a general-purpose processor, rather than being done in special-purpose hardware (electronic circuits). The software-defined waveform module 300 provides a radio which can receive and transmit widely different radio protocols (or waveforms) based on the software used.

Antenna Array

In one non-limiting embodiment, the antenna array 310 includes two receive antennas 310-1, 310-2 and one of the antennas 310 serves as a transmit antenna. As noted above, receive operations at the dismount nodes 110 occur on "odd" hop-time intervals. If a code word was not received error free, receive operations at the dismount nodes 110 also occur on "even" hop-time intervals. As also explained above, the sender dismount node transmits on odd numbered hop intervals, while re-transmissions by other dismount nodes that receive the sender's transmission error-free occur on even number hop intervals for flood routing. Providing two receive antennas 310-1, 310-2 allows for space-spectrum processing. The antennas 310 also provide a platform to implement space-time encoding/decoding to improve performance and to perform beamforming on a per link basis by processing DSSS signals received by both two receive antennas 310-1, 310-2 during mRAKE receiver 324 processing (as will be described in greater detail below).

Transmitter

The transmitter processing chain 340 includes a broadcast and LDPC encoder module 342, an interleaver module 344, a spreading and scrambling module 346, a modulator module 347, and a beamformer and hop assignment module 348.

Depending on whether the dismount nodes is the original source of a transmission, or acting as a relay node, the broadcast and LDPC encoder module 342 can receive original information source bits from either the MAC module 330 (when the dismount node is the original source of a transmission) or from the gather, de-interleave and decoder block 328 (when the dismount node is acting as a relay node). The broadcast and LDPC encoder module 342 packetizes and encodes the original information source bits for each code word with a broadcast or erasure class code (e.g., fountain codes, Luby transform (LT) codes) to ensure reliable transport, and concatenates a physical layer forward error correction (FEC) code as the inner code to the broadcast code to generate encoded code words. The type of network or broadcast coding employed can vary depending on the implementation and fall under the general class of fountain or erasure codes. These near rateless codes can include, for example, LT codes, Raptor codes, as well as traditional block codes, e.g. hamming codes. The physical layer's FEC code can include, for example, convolutional coding, Reed Solomon coding, turbo coding, low density parity check (LDPC) coding. Specifically, in one embodiment, a LDPC 'short' code is concatenated with the Bose, Chaudhuri, and Hocquenghem (BCH) code or other cyclic error-correcting codes that are constructed using polynomials over a finite field. As is known in the art, BCH codes form a large class of powerful random error-correcting cyclic codes. In one embodiment, the physical layer FEC code leverages the developments of the Digital Video Broadcasting—Second Generation Terrestrial (DVB-T2) and Digital Video Broadcasting—Satellite—Second Generation (DVB-S2) standards. As suggested by the DVB-Next-Generation-Handheld (NGH) standard, the length of the LDPC code can be made to be used with shorter block sizes (~4K), motivated by greater efficiencies and less processing power. Code rates 1/4, 1/2, and 3/4 can be employed to produce a range of effective bit rates.

Regardless of the implementation, network or broadcast coding helps ensure error-free message distribution by efficiently reconstructing dropped or missing code words from a subset of received packets on the forward link. This method of reliable transport far surpasses the traditional Automatic Repeat Query (ARQ) protocol's closed-loop response, overhead signaling, and increased latency resulting from re-traversing the network links.

The interleaver module 344 interleaves bits of each encoded code word across multiple hops to generate an interleaver output comprising interleaved code words for the transmission. The interleaver module 344 interleaves a code word across multiple hops to mitigate the degradation due to loss of a hop due to link or jamming. For example, with a block interleaver the code word bits are written row by row into a matrix and then transmitted column by column. In other embodiments, other interleaver approaches can be utilized including, but not limited to, convolutional interleavers, random interleavers, code matched interleavers, etc. In one embodiment, the interleaver module 344 can be the same at each dismount node. In another embodiment, each dismount node uses a different or unique interleaver so that the loss of a hop degradation is further minimized. By using a different or unique interleaver module at each of the dismount nodes, performance can be improved due to the fact each node would have different time-varying properties (e.g., symbols from some relayed transmissions might be received even if they aren't received from other relayed transmissions). This approach adds more diversity to transmitting dismount nodes sharing correlated channels.

The spreading and scrambling module 346 performs a number of different coding functions. In one embodiment, each dismount node is assigned a designated code for scrambling the signal. The codes that are used can vary depending on the implementation. The codes that are used can be any class of codes that possess desirable auto and cross correlation properties (e.g., Kasami and Gold codes). For example, in one embodiment, each dismount node is assigned a Kasami code for scrambling the signal over a wide spectrum range. Kasami sequences are binary sequences of length $2^N-1$ where N is an even integer. Kasami sequences have good cross-correlation values. There are two classes of Kasami sequences—the small set and the large set. The spreading and scrambling module 346 scrambles the interleaver output signal using the Kasami code assigned to that dismount node. In one implementation, the protected FH/DSSS waveform operates at 2.5 megachips/second (Mcps) and up to 10 kilohops/second, with a DSSS spreading factor of 32, 16 or 8.

The spreading and scrambling module 346 also uses channelization codes to separate control and data channels. For instance, in one embodiment, the waveform can be spread orthogonal variable spreading factor (OVSF) codes, such as those defined in 3rd Generation Partnership Project (3GPP) specifications. The OVSF codes can be used to provide multiple physical channels from a single dismount node. In one implementation, the number of OVSF codes per node ranges from two to five. One OVSF code is dedicated to the pilot sequence for channel tracking, and the other OVSF codes are used with one, two, or four data channels.

The spreading and scrambling module 346 also employs an AES scramble code to provide physical layer transmission security (TRANSEC) to protect transmissions from interception (i.e., to provide low probability of interception (LPI)). The AES scramble code also indicates the hop number (i.e., time to live (TTL) field). The temporal structure of the AES scramble code provides reliable timing information to derive frame ordering and also eliminates the overhead required by upper-layer signaling.

Prior to transmission, the spreading and scrambling module 346 can generate a spreader output by spreading the interleaver output onto a DSSS signal using the OVSF spreading code to generate a spread signal, and then scramble the spread signal using the both the unique scramble code assigned to that dismount node together with a common TRANSEC scramble code that is shared across the other nodes. The unique scramble code also identifies that dismount node and can thus be used by other nodes to distinguish transmissions received from that dismount node. The spreading and scrambling module 346 can also separate control and data channels using orthogonal variable spreading factor (OVSF) codes to provide multiple physical channels. Examples of these different physical channels can include a pilot channel for tracking, a synchronization channel for synchronizing transmissions with those from other dismount nodes so that transmission arrive during a common mRAKE receiver window, and a plurality of data channels. In one embodiment, separate logical channels are provided and used for initial synchronization, synchronization maintenance and late joiner synchronization.

In one embodiment, a user or node identifier is determined by its scramble sequence. For example, in one implementation, the scramble code can be a Kasami code that is applied after spreading has occurred using a spreading code, i.e. on a chip basis. This is a unique assignment to each user node and permits a receiver to distinguish between the multiple transmitting nodes. In addition, a random scramble code (e.g. TRANSEC or AES sequence) can also be applied that is common across all nodes and changes on a per hop basis. As such, this random scramble code provides inherent timing information on a hop-by-hop basis. The spreader output from the spreading and scrambling module 346 includes a constant (Kasami) scramble code unique to the node ID and hop-varying TRANSEC scramble code. The modulator module 347 (also referred to as modulation module 347 or modulator) can modulate the spreader output to generate a modulated output for the transmission. In one embodiment, the modulator 347 can convert the chips from the spreading and scrambling module 346 into a modulated signal. Examples of modulators that can be used for this purpose can include, for example, BPSK, QPSK, GMSK, and/or other featureless waveforms. In one embodiment, the modulation module can employ both BPSK and QPSK modulation to balance receiver sensitivity to achieve bit rates to meet application needs. When combined with the use of one, two, or four OVSF codes this provides a wide range of scalable throughput each with different LPD detection range performance without adding complexity.

The dismount node 110 can also include a beamformer and hop assignment module 348. The hop assignment module (not illustrated) includes a Fast-Frequency Hopping (FFH) transmitter that can assign a hop number to for transmissions by that dismount node to employ fast-frequency hopping for LPI. In one embodiment, the hop number is a function of time, whereas hop frequency is based on pseudo-random sequence. A random, non-predictable hop pattern helps achieve LPI. The FH/DSSS waveform can be designed to tolerate the distortion artifacts (i.e., settling time) associated with rates as high as 10 khop/sec. Optimal LPD performance is achieved at slower hop rates when operating with lower spectral efficiency (or more coding gain). The beamformer module (not illustrated) can update amplitude and phase weightings of the DSSS signal that is provided to the two or more antennas. Notably, dismount nodes perform receive beamforming and generally do not perform transmit beamforming due to their broadcast nature. However, in some implementations, there is nothing precluding a dismount node from doing transmit beamforming if the situation warrants. By contrast, mounted nodes can perform receive beamforming, and also perform transmit beamforming for reach back to a squad. The transmit beamforming is based on channel reciprocity.

Receiver

The receiver processing chain 320 includes a de-hop and the adaptive space-spectrum whitener 322, a multi-user RAKE receiver 324, a maximum likelihood ratio combiner module 326, a data de-spreader module 327, and a gather, de-interleave and decoder block 328. In comparison to conventional cooperative broadcast receivers, the receiver 320 avoids the need of excessive coordination and multi-user detection, and is also significantly less complex, requires less processing, more economical, and approaches similar diversity gains typically only afforded to beam combining. As will be explained in greater detail below, the received signal(s) from multiple transmitters (e.g., one or more transmitters) will be the combined by the receiver 320. Joint demodulation can be performed by using information spanning multiple consecutive hops. By using information across multiple hops spanning more time, more channel information can be utilized. The cooperative beam combining strategy helps ensure that diversity is maintained by reducing or minimizing destructive interference. When applying this strategy encoded over a modern FEC block code, diversity gains approaching beam combining can be achieved with far lower complexity and cost.

The de-hop and the adaptive space-spectrum whitener 322 channelizes the input spectrum and the adaptive space-spectrum whitener uses covariance analysis to detect and remove large interference from the received signal to provide jammer/interference mitigation. The use of two receive antennas 310-1, 310-2 allows one interferer/jammer to be removed from each channel. To explain further, in one embodiment, the de-hop and the adaptive space-spectrum whitener 322 can include a de-hop module and an adaptive space-spectrum whitener module. The de-hop module can de-hop each of the received DSSS signals by tuning to a particular frequency to receive each DSSS signal and then channelizes the input spectrum for each of the received DSSS signals to generate beam samples for each of the channelized signals. The adaptive space-spectrum whitener module can perform adaptive space-spectrum whitening to detect and remove interference signals from each channel by performing a covariance analysis to generate channelized versions of the DSSS signals. Each channelized version of DSSS signals comprises transformed beam samples for each channel.

In this embodiment, the multi-user RAKE receiver 324 and the maximum likelihood ratio combiner module 326 collectively provide a multi-channel beamformer module that can perform cooperative beamforming on a per channel (or per link) basis by processing signals received by both two receive antennas 310-1, 310-2 (with interference removed) and coherently combining a subset of transmissions and multipath components for each transmission that are received from other nodes together and have sufficient signal strength (e.g., greater than or equal to a threshold) to be beneficial to the coherent combining. In one embodiment, this can be accomplished by time aligning the respective signals of interest, and removing frequency offset and phase offset from each transmission. The number of transmissions in the subset can be selected, for example, based on processing power, battery life and performance. This can include downlink transmissions received from the other nodes including: (1) any downlink transmission that is received error free from the mounted node, and multi-path components of any downlink transmission that is received error free from the mounted node; and (2) any re-transmitted downlink transmissions that are received error free from relay dismount nodes, and any multi-path components of any re-transmitted downlink transmissions that are received error free from relay dismount nodes.

To explain further, in one embodiment, the multi-user RAKE receiver 324 processes each of the channelized signals (e.g., signals received by both two receive antennas 310-1, 310-2 with interference mitigated) during mRAKE receiver 324 demodulation processing. In one embodiment, the multi-user RAKE receiver 324 performs RAKE receiver demodulation processing aided by the scramble codes and OVSF separated pilot signal. Scramble code correlations can be performed on a per channel basis to align symbols of each of the channelized signals (e.g., perform symbol alignment without the overhead of framing or field counters). One example implementation of the multi-user RAKE receiver 324 will be described in greater detail below with reference to FIG. 3B.

The use of DSSS coding allows the receiver to maximally ratio combine (or combined beamform) the signals received from radios of multiple transmitting nodes. This approach allows for operation in severe delay dispersive environments (e.g., forest and urban) and with fast moving mobile users. Once the soft decisions are received across all scramble codes, the maximum likelihood ratio combiner module 326 maximally ratio combines (or combine beamforms) aligned symbols for each of output from each of the number (N) of fingers, on a per channel basis, to generate a soft decision across each of the multiple channels, and then combines the soft decisions into a joint soft decision for use by the data de-spreader module 327, and then the gather, de-interleave and decoder block 328 during forward error correction (FEC) and broadcast decoding (described below).

The data de-spreader module 327 converts the chips from the combined signal to data symbols. In other words, the data despreader module 327 despreads chips to generate data symbols that can then be provided to the gather, de-interleave and decoder block 328.

The gather, de-interleave and decoder block 328 gathers data across multiple hops to form soft-decision codeword bits, which can be referred to as log-likelihood ratio (LLRs). The gather, de-interleave and decoder block 328 can include a gather block that concatenates the data soft-decision bits from each hop across multiple received hops together to form codeword soft-decision bits, a de-interleaver block that can de-interleave the codeword soft-decision bits, and a decoder block that can perform low density parity check (LDPC) forward error correction (FEC) decoding and broadcast decoding on the codeword soft-decision bits to recover information bits corresponding to the complete codeword. As noted above, the types of coding used in the network can vary depending on the implementation and can include LT codes, Raptor codes, fountain codes for broadcast erasure type code, and convolutional coding, Reed Solomon coding, turbo coding, low density parity check (LDPC) coding for physical layer forward error correction (FEC). In one implementation, a 4096 symbol LDPC decoder is used with rates of 1/4, 1/2 and 3/4. For QPSK modulation, each I/Q rail is processed as a separate code word. In one implementation, multiple I-Q channels are dedicated to the same codeword. When utilizing multiple OVSF codes for more data channels, up to eight (8) code words are processed. To minimize the processing impact of multiple FEC channels, higher rates only utilize higher coding rates. QPSK uses rate 1/2 and 3/4 codes, whereas multiple OVSF are QPSK and rate 3/4 only. Adding further resiliency, an outer broadcast code brings the capability to reconstruct missing or dropped information packets.

In one embodiment, the MAC module 330 can include a power control module that encodes power control information (e.g., transmit power) in a PTT packet. The power control module (not shown) can add link status information to the packet and propagate link status information through the network through short link status messages. This permits nodes to perform "what if" scenarios to determine the effect of either increasing or reducing the power when sending or relaying a message. To explain further, a source node (that originates the transmission) can encode the message with its transmit power. As noted above, the source node transmits on odd numbered hop intervals. Nodes that receive the message can estimate the receive SNR, and together with knowledge of the source node's transmit power, can adjust their transmit power and re-transmit relevant messaging including their transmit power on even numbered hop intervals. The source node and other relay nodes will receive that message, estimate SNR, and re-adjust their transmit power. In one embodiment, this information can be encoded in both synchronization messages and push-to-talk (PTT) messages. Given the dynamic nature of dismount nodes in terrain, and the broadcast relay approach, this will be a slow loop (seconds) that is based upon adjusting link margin to terrain-environment (e.g., versus a cellular approach to adjust transmit power to instantaneous conditions at rates of 1500 Hz).

When the dismount node is a source/sender that is transmitting data from the physical layer, the input/output (I/O) interface 350 provides data to the MAC module 330, and the MAC module 330 serves as the data bit source. For example, the MAC module 330 encapsulates higher-level frames into frames appropriate for the transmission medium (e.g., the MAC adds a syncword preamble and also padding if necessary), adds a frame check sequence to identify transmission errors, and then forwards the data to the physical layer as soon as the appropriate channel access method permits it. The MAC module 330 controls when data is sent and when to wait to avoid congestion and collisions. The MAC module 330 is also responsible for initiating retransmission if a jam signal is detected, and/or negotiating a slower transmission rate if necessary.

When receiving data from the gather, de-interleave and decoder block 328, the MAC module 330 ensures data integrity by verifying the sender's frame check sequences, strips off the sender's preamble and padding, before passing the data up to the higher layers where code words received from the gather, de-interleave and decoder block 328 are translated into actual data (e.g., voice packets, IP packets, Ethernet frames, or any other type of I/O, etc.) and eventually to the input/output (I/O) interface 350.

Due to reflections from obstacles a radio channel can consist of many copies of originally transmitted signals having different amplitudes, phases, and delays. Multipath components are delayed copies of the original transmitted wave traveling through a different echo path, each with a different magnitude and time-of-arrival at the receiver. In other words, the multipath components are time-delayed versions of the original signal transmission. Since each component contains the original information, if the magnitude and time-of-arrival (phase) of each component is computed at the receiver, the multipath components can be combined to improve information reliability.

Figure 3B:
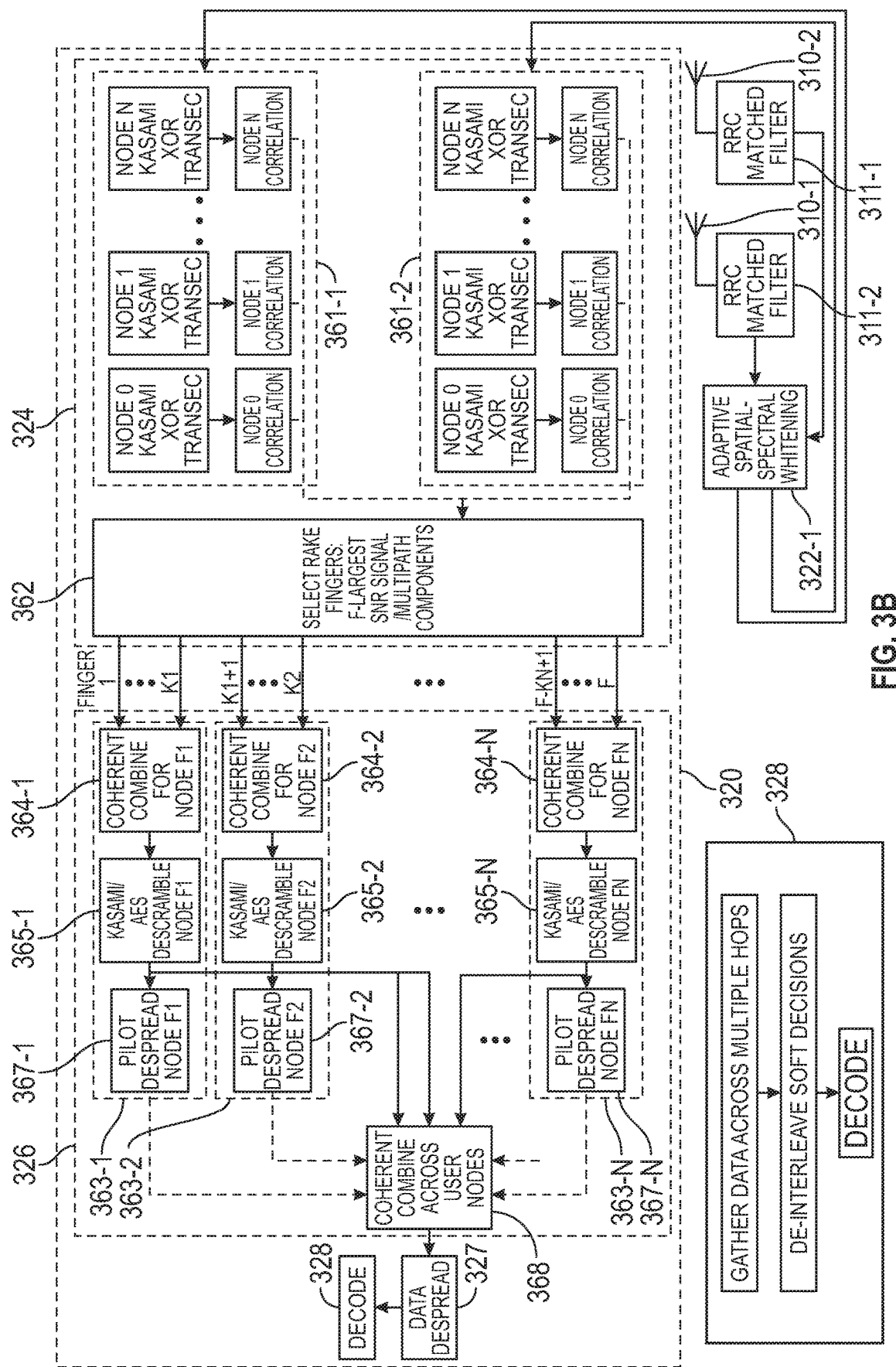
FIG. 3B is a block diagram that illustrates one non-limiting implementation of a portion of a receiver processing chain of FIG. 3A in accordance with one implementation of the disclosed embodiments.

FIG. 3B shows a block diagram of a portion of the receiver processing chain 320 of FIG. 3A in accordance with one implementation of the disclosed embodiments. In particular, FIG. 3B illustrates the antennas 310-1, 310-2 and corresponding RRC matched filters 311-1, 311-2, the multi-user RAKE (mRAKE) receiver 324 of FIG. 3A in one particular implementation, a maximum likelihood ratio combiner module 326, a data despreader module 327, and a gather, de-interleave and decoder block 328.

As shown in FIG. 3B, each antenna 310 receives incoming signals on their respective spatial channel which is then sent to a corresponding RRC matched filter 311. Each receive antenna channel can include transmissions that are directly received from one or more nodes, and/or one or more multipath components of those transmissions. As such, the signals received by each antenna can include signals that are received directly from one or more the nodes, and/or multipath components of those signals. Each RRC matched filter 311 then filters the incoming signals to isolate the frequency spectrum containing the signal of interest, and generates outputs that are then provided to an adaptive space-spectrum whitener 322-1, which can be one part of the de-hop and the adaptive space-spectrum whitener 322 of FIG. 3A.

The adaptive space-spectrum whitener 322-1 can perform adaptive space-spectrum whitening to detect and remove interference signals from each channel by performing a covariance analysis to generate channelized versions of the DSSS signals. Each channelized version of DSSS signals comprises transformed beam samples for each channel. The adaptive space-spectrum whitener 322-1 outputs channelized signals (received by both the receive antennas 310-1, 310-2 with the interference mitigated) to the correlation modules 361-1 and 361-2 of the mRAKE receiver 324.

A conventional RAKE receiver combines multipath components of a single received transmission. By contrast, the multi-user RAKE or mRAKE receiver 324 in accordance with the disclosed embodiments combines node transmissions and multipath receptions of multiple received node transmissions. Thus, instead of multiple RAKE receivers assigned to multiple users, the mRAKE receiver 324 receiver correlates over multiple users, frequencies and their respective multipath component(s). The multi-user RAKE receiver 324 includes correlation modules 361-1 and 361-2 and a finger selection module 362. Each of the correlation modules 361-1, 361-2 includes correlator banks for each node 1, . . . , N.

As noted above, the adaptive space-spectrum whitener 322-1 outputs two whitened spatial streams to the respective correlation modules 361-1 and 361-2. Each whitened spatial stream is a linear combination of the original spatial stream resulting from the antennas 310-1 and 310-2. One or more of these spatial whitened streams will contain the signal of interest with the interference mitigated. As such, each correlation module 361 (also referred to as correlator banks 361) can process one spatial stream that is output from the adaptive space-spectrum whitener 322-1.

As shown in FIG. 3B, each correlator module 361 includes one correlator block for each of the N nodes. Each correlator block performs correlation for a particular node by processing a spatial stream received from the adaptive space-spectrum whitener 322-1 and a corresponding scramble code for a particular node. In other words, each correlator block is driven by a unique scramble code that identifies transmissions from a particular node (and that can be used to distinguish transmissions received from that particular node from those received from other nodes). Each correlator block can receive signals that can include transmissions from any number of nodes and/or multi-path components of those transmissions, and determine channel-multipath correlations. Based on a received signal and one of the scramble codes, each correlator can generate one or more mRAKE fingers. Each finger corresponds to a specific channel. Each finger can be, for example, a specific channel/signal pair for a particular node, or a specific channel/multipath component pair for a particular node. In this particular non-limiting example shown in FIG. 3B, the corresponding scramble code that is input to each correlator block is a Kasami code for a particular node that is logically combined (e.g., XOR-ed) with a security code (e.g., a TRANSEC code). Each correlator block processes the outputs from the adaptive space-spectrum whitener 322-1 and its corresponding scramble code to determine the mRAKE's candidate fingers' multipath location and respective complex weight The fingers from each correlator block are input to the finger selection module 362. The finger selection module 362 selects a subset (F) of these fingers that have sufficient correlation and outputs one or more of the fingers (F). The finger selection module 362 selects which nodes contribute to the F total largest signal multipath components received.

The maximum likelihood ratio combiner module 326 includes a plurality (1 ... N) of processing modules 363 and a coherent combiner module 368. Each of the processing modules 363 include a coherent combiner module 364-1 ... 364-N, a descrambler 365-1 ... 365-N, and a pilot despreader module 367-1 ... 367-N. Each processing module 363 corresponds to a particular node (N1 ... NN) of the network and processes signals for that node (N1 ... NN), where N is less than or equal to F. Each processing module 363 includes a coherent combine module 364, a descrambler 365, and pilot despreader module 367.

In this embodiment, the finger selection module 362 outputs a number of the subset of fingers 1 ... F to a corresponding coherent combine module 364-1 ... 364-N of each processing module 363-1 ... 363-N. Each coherent combine module 364 receives a number of fingers (labeled as Finger 1 through Finger K) and coherently combines the fingers (labeled as Finger 1 through Finger K) to generate an output signal that is then processed by a corresponding descrambler 365. As such, one or more of the fingers (1 ... K1) are input to a coherent combine module 364-1 for Node 1, one or more of the fingers (K1+1 ... K2) are input to a coherent combine module 364-2 for Node 2, ... one or more of the fingers (F-KN+1 ... F) are input to a coherent combine module 364-N for Node N, where N<=F. The output of each coherent combine module 364-1 ... 364-N for each node is sent to a corresponding descrambler 365-1 ... 365-N. As such, the output of the coherent combine module 364-1 for Node 1 is provided to descrambler 365-1, the output of coherent combine module 364-2 for Node 2 is provided to descrambler 365-2, ... and the output of the coherent combine module 364-N for Node N is provided to descrambler 365-N.

In one embodiment, each descrambler 365 processes one or more of the fingers output by its corresponding coherent combine module 364 using a code (e.g., Kasami code for a particular node, AES code and/or combination of a Kasami code and an AES code) to descramble the output of its corresponding coherent combine module 364. A descrambled signal output by each descrambler 365 is then provided to a corresponding pilot despreader module 367, which can process the descrambled signal that it receives to generate a despread pilot signal. As will be explained below, the despread pilot signals are used by the coherent combiner module 368 to coherently combine the descrambled signals that are output from each of the descramblers 365-1 ... 365-N. The resulting despread pilot signals for each received node can permit more accurate timing and phase tracking to maximize the coherent combining of the descrambled signals received across multiple nodes.

The coherent combiner module 368 coherently combines descrambled signals that are output from each of the descramblers 365-1 ... 365-N of the processing modules 363-1 ... 363-N. To explain further, each of the descrambled signals from the descrambler modules 365-1 ... 365-N (show as solid lines in FIG. 3B) can then be coherently combined at the coherent combiner module 368. The coherent combiner module 368 can be implemented as one part of the maximum likelihood ratio combiner module 326 of FIG. 3A. In other words, each of the descrambled signals (output by the Kasami/AES descrambler modules 365-1 ... 365-N) can then be coherently combined (at the coherent combiner module 368) across all user nodes to generate a coherently constructed signal. To explain further, in one embodiment, the coherent combiner module 368 coherently combines, using pilot soft-decision bits from each of the despread pilot signals for each node, each of the descrambled signals received across multiple nodes to generate a coherently constructed signal of spread data channels that includes a coherently combined vector of chips of information, which is then provided to the data despreader module 327.

Maximal-ratio combining is a form of diversity combining that yields the maximal SNR achievable. It requires the exact knowledge of SNRs as well as the phases of the diversity signals. The symbols from allocated fingers can be maximal-ratio-combined to construct a coherently "combined" symbol. For example, the output symbols from different fingers are multiplied with complex conjugate of the channel estimate and the result of multiplication is summed together into the "combined" symbol. If maximal-ratio combining is implemented, the overall decision statistic (Z') can be expressed in equation (1) as follows:

$$Z^i = \sum_{m=1}^{M} \alpha_m Z_m \quad (1)$$

The weighting coefficients, $\alpha_m$, represent finger weights, and, in one implementation, can be normalized to the output signal power of the correlator in such a way that the coefficients sum to unity.

Figure 4:
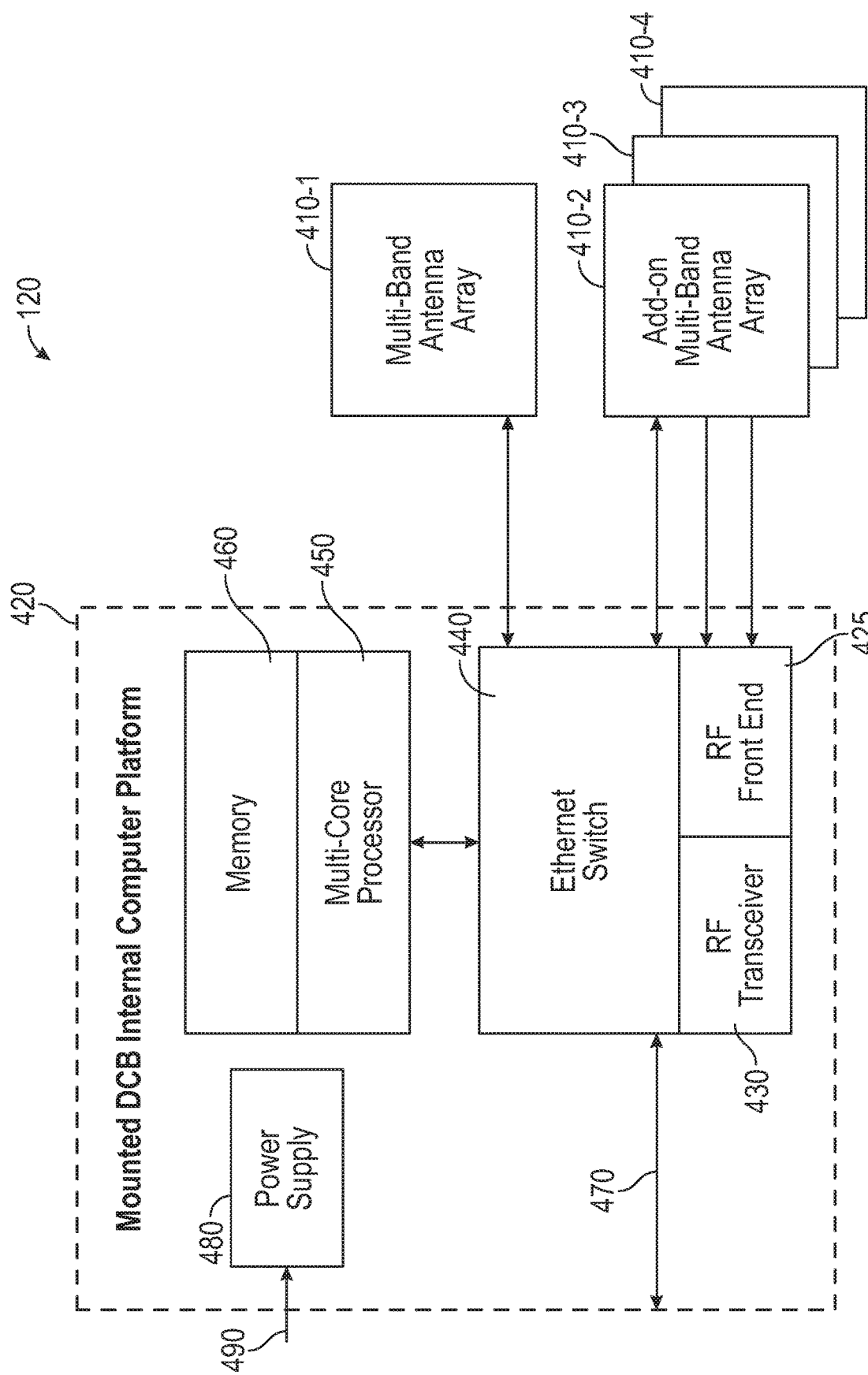
FIG. 4 is an exemplary functional block diagram of a mounted node in accordance with the disclosed embodiments.

Referring again to FIG. 3B, the data despreader module 327 converts the chips from the respective data channels to generate demodulated data symbols that are converted into data soft-decision bits that can then be provided to the gather, de-interleave and decoder block 328. The gather, de-interleave and decoder block can include a gather block that concatenates the data soft-decision bits from each hop across multiple received hops together to form codeword soft-decision bits, a de-interleaver block that can de-interleave the codeword soft-decision bits, and a decoder block that can perform low density parity check (LDPC) forward error correction (FEC) decoding and broadcast decoding on the codeword soft-decision bits to recover information bits corresponding to the complete codeword. For example, in one implementation, during transmission, the FEC codeword produced by the broadcast and LDPC encoder module 342 is transmitted through beamformer and hop assignment module 348 spanning multiple hops enhancing diversity. At the receiver, the gather, de-interleave and decoder block 328 concatenates the demodulated data symbols across multiple received hops accumulating data symbols or data soft-decision bits corresponding to a complete codeword. The data soft decision bits are then de-interleaved via a de-interleaver of the gather, de-interleave and decoder block 328. The gather, de-interleave and decoder block 328 decodes the symbols to generate information bits that are then provided to the MAC module 330 of FIG. 3A FIG. 4 is an exemplary functional block diagram of a mounted node 120 in accordance with the disclosed embodiments. The mounted node 120 includes a housing (not shown) that encloses or houses various hardware components of the mounted node 120. Hardware components of the mounted node 120 can include at least one multi-band antenna array 410-1 (and optionally additional multi-band antenna arrays 410-2 ... 410-4), and a computer platform 420. The computer platform 420 includes an RF transceiver 430, an Ethernet switch 440, a processor unit 450, memory 460, and a power supply 480 that receives vehicle power 490 used to power the mounted node 120. Although not illustrated, the mounted node 120 can include a user interface (e.g., a microphone, a speaker and optionally a keypad, a display or any other element or component that conveys information to a user of the mounted node 120 and/or receives input from the user).

In this embodiment, each antenna array 410 includes four or more antennas (not illustrated in FIG. 4) as will be described in greater detail below with reference to FIG. 5. It should be appreciated that in other implementations, the mounted node 120 may also include additional antenna arrays 410-2 ... 410-4. The mounted node 120 allows for voice and data communications with squad members using the FH/DSSS waveform and cooperative beamforming.

The mounted node 120 also includes RF front end 425 which synchronously digitizes the receive signals from each antenna as well as transmits the waveform. Each antenna represents a single channel. In one embodiment, the mounted can have multiple channels. The RF transceiver 430 is electrically coupled to the antenna array(s) 410. The RF transceiver 430 includes a transmitter (not illustrated in FIG. 4) and a receiver (not illustrated in FIG. 4) to allow transmission of data to, and reception of data from, other dismount nodes and the mounted node 120 (and optionally other mounted nodes that are not illustrated in FIG. 1). As such, the RF transceiver 430 receives communications from the various nodes, and transmits communications to the various nodes. It should be appreciated that in other implementations, the mounted node 120 may also include (not shown) multiple transmitters, multiple receivers, and/or multiple transceivers.

The Ethernet switch 440 can support IP connectivity for mobile communications, and includes multiple Ethernet ports to support multiple antennas. The processor unit 450 controls operation of the mounted node 120. The processor unit 450 may also be referred to as a central processing unit (CPU). The processor unit 450 may comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processor unit 450 performs numerous functions for the mounted noted. For example, the processor unit 450 controls a Human-to-Machine (HMI) interface (not illustrated in FIG. 4), interfaces with the RF transceiver 430, performs RF data processing, detects and quantifies the level of signals received by the RF transceiver 430, performs all upper and physical layer waveform processing, provides timing control, etc.

The memory 460 can provide instructions and data to the processor unit 450. The processor unit 450 typically performs logical and arithmetic operations based on program instructions stored within the memory. The instructions in the memory can be executable to implement the methods described herein. Memory can include both read-only memory (ROM), random access memory (RAM), and non-volatile random access memory (NVRAM). The processor unit 450 may also include machine-readable media for storing software. Software shall be construed broadly to mean any type of instructions, whether referred to as software, firmware, middleware, microcode, hardware description language, or otherwise. Instructions may include code (for example, in source code format, binary code format, executable code format, or any other suitable format of code). The instructions, when executed by the one or more processors, cause the processing system to perform the various functions described herein.

In one embodiment, the power supply 480 can be a power supply designed to meet the MIL-STD-1275E standard requirements are typically used in military ground vehicle power applications that employ a nominal 28 V power supply system that is able to handle transient spikes and surges.

Figure 5:
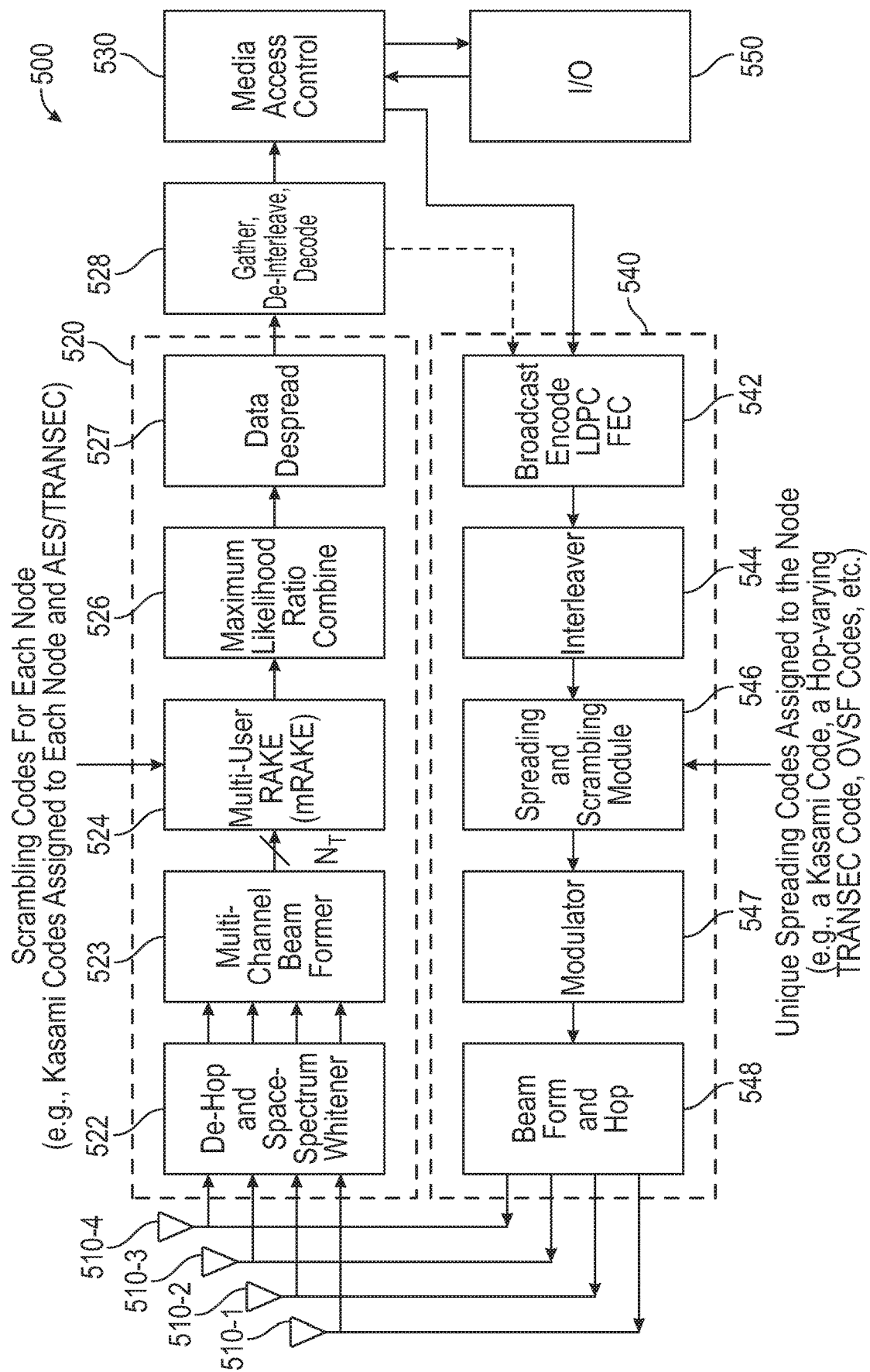
FIG. 5 is a block diagram of a software-defined waveform module of a mounted node in accordance with the disclosed embodiments.

FIG. 5 is a block diagram of a software-defined waveform module 500 of a mounted node 120 in accordance with the disclosed embodiments. The software-defined waveform module 500 may also be referred to as a software-defined hybrid FH/DSSS transceiver module. As noted above, the mounted node 120 transmits on odd numbered hop intervals when it is the originator of a network transmission. By contrast, the mounted node 120 transmits on even hops when it operates as a relay (e.g., is not the originator) and repeats (i.e., re-transmits) the received messages when they have been received error free.

The software-defined waveform module 500 includes an antenna array 510, a receiver processing chain 520 that defines a receiver path, a transmitter processing chain 540 (also referred to herein as "transmitter") that defines a transmission path, a media access controller 530, and an input/output (I/O) interface 550. As shown in FIG. 5, the software-defined waveform module 500 includes many of the same blocks as the dismount node 110 that were described above with reference to FIG. 3A, and the processing performed by similar blocks is essentially the same. For sake of brevity, the description of blocks that are the same or similar to those in FIG. 3A will not be repeated again with reference to FIG. 5. The main differences between the software-defined waveform module 500 of the mounted node 120, and the software-defined waveform module 300 of the dismount node 110 (shown in FIG. 3A) will now be described below.

Antenna Array

Because the mounted node 120 does not have the same size and power constraints as a dismount node, the mounted node 120 can have more antennas 510-1 ... 510-4 and additional processing resources. In one non-limiting embodiment, each antenna array 510 includes four receive and transmit antennas 510-1, 510-2, 510-3, 510-4. The antennas 510-1, 510-2, 510-3, 510-4 of the mounted node are part of a multi-band phased antenna array having a number (N) of antennas that including at least the first, second, third and fourth antennas 510-1, 510-2, 510-3, 510-4. Each antenna 510-1, 510-2, 510-3, 510-4 of the multi-band phased antenna array is configured to receive DSSS signals from one or more dismount nodes and generate an output.

Transmitter

The transmitter processing chain 540 includes a broadcast and LDPC encoder module 542, an interleaver module 544, a spreading and scrambling module 546, a modulator 547 and a beamformer and hop assignment module 548. The broadcast and LDPC encoder module 542, interleaver module 544 and the spreading and scrambling module 546 also operate similar to corresponding elements of the dismount node 110 that are described above with reference to FIG. 3A and therefore the description of those elements will not be repeated for sake of brevity.

The mounted node 120 can also include a beamformer and hop assignment module 548. As with the beamformer and hop assignment module 348, the hop assignment module (not illustrated) includes a Fast-Frequency Hopping (FFH) transmitter that can assign a hop number to for transmissions by that mounted node to employ fast-frequency hopping for LPI. In one embodiment, the frequency-to-hop interval mapping can be defined by an encryption sequence (e.g. Advanced Encryption Standard (AES) key stream). The AES, also known by its original name Rijndael, is a specification for the encryption of electronic data established by the U.S. National Institute of Standards and Technology (NIST) in 2001. The algorithm described by AES is a symmetric-key algorithm, meaning the same key is used for both encrypting and decrypting the data. However, the beamformer module of the beamformer and hop assignment module 548 of the mounted node 120 differs from the beamformer and hop assignment module 348 of the dismount node 110. The beamformer and hop assignment module 548 of the mounted node 120 implements transmit beamforming to focus RF emissions towards the dismount nodes 110 of the network. The formed beams are formed based upon the receiver beamforming information. In high mobility scenarios the initial beam will be broad, and upon receiving relay dismount nodes 110 retransmissions on even hops the beams will be dynamically updated to focus transmissions towards those relay dismount nodes 110, while reducing RF power in other directions.

Receiver

As will be explained in greater detail below, the receiver 520 combines received signal(s) from one or more of the dismount nodes 110 using a cooperative beam combining strategy that helps ensure that diversity is maintained by minimizing destructive interference. When applying this strategy encoded over a modern FEC block code, diversity gains approaching ideal transmit beam combining can be achieved. To explain further, in comparison to conventional distributed cooperative broadcast beamforming, the choice to beamform at receiver 520 avoids the need of excessive coordination, is significantly less complex, scalable, operates over extensive channels and frequency bands, requires less processing, more economical, and approaches similar diversity gains typically only afforded to transmit beam forming with far lower complexity and cost.

Referring again to FIG. 5, the receiver processing chain 520 includes a de-hop and adaptive space-spectrum whitener 522, a multi-channel beamformer module 523, a multi-user RAKE receiver 524, a maximum likelihood ratio combiner module 526, a data despreader module 527, and a gather, de-interleave and decoder block 528. As explained above, receive operations at the mounted node 120 occur on odd numbered hop intervals. If a code word was not received error free, receive operations at the mounted node 120 also occur on even numbered hop intervals. Processing performed by the receiver processing chain 520 of the mounted node 120 is similar to that performed by the dismount radio with some differences that will now be described.

The de-hop and the adaptive space-spectrum whitener 522 operates similar to corresponding elements of the dismount node 110 that are described above with reference to FIG. 3A, and therefore the description of those modules will not be repeated here with respect to FIG. 5 for sake of brevity. A difference is that performance is improved through the use of additional antennas 510, and as such, the de-hop and the adaptive space-spectrum whitener 522 processes more input information (e.g., four inputs from four receive antennas versus two antennas in FIG. 3A) and generates more output information (e.g., four outputs versus two outputs in FIG. 3A). Although the embodiment illustrated in FIG. 5 includes four antennas, it should be appreciated that other numbers of antennas can be implemented depending on the implementation. With the additional spatial channels and spatial streams of output information from the space-spectrum whitener 522, the multi-channel beamformer 523 and multi-user RAKE 524 are capable of producing higher receive signal SNR afforded by both the mounted unit's additional channels and processing capability.

The use of four receive antennas 510-1, 510-2, 510-3, 510-4 allows the mounted node 120 to extend and enhance the signal processing capabilities of the mounted node 120, and also allow for enhanced cooperative beamforming capabilities via a multi-channel beamformer module 523 (that will be described below). Significant performance differences include: active transmit and receive beamforming across four antenna 510-1 . . . 510-4 and more capable space-spectrum jammer/interference mitigation, and the processing of more RAKE fingers (at multi-user RAKE receiver 524) combining more nodes into the uplink beamforming. At a simplistic level, the additional processing provides range extension to the squad network without increasing the RF signature of the squad thereby helping to maintain the LPD capability of the squad.

The multi-channel beamformer module 523 performs beamforming on a per link/channel basis by processing signals received by the receive antennas 510-1, 510-2, 510-3, 510-4 with interference removed. To explain further, the multi-channel beamformer module 523 can perform beamforming on a per channel basis by coherently combining all of the DSS signals received from the dismount nodes by performing a matrix operation that linearly transforms the channelized signals (e.g., outputs received from each of the number (N) of antennas) into a smaller number ($N_T$) of directional beams. As such, the transmissions received across each of the number (N) of antennas of the multi-band antenna array can be coherently combined on a per link basis to generate a corresponding directional beam. For example, the multi-channel beamformer module 523 can perform a matrix operation that transforms inputs from N (e.g., 4) antennas of the phased array antenna into a number ($N_T$) of received beams (like sectors) to improve SNR, while also potentially reducing the number of channels that need to be processed (e.g., 16 antennas, but only 4 beams are ultimately fed into the multi-user RAKE receiver 524).

In one embodiment, to provide adaptive beamforming received from each transmitting node (sender and/or relay), the multi-channel beamformer module 523 performs a linear transformation of the whitened spatial streams to create multiple directional beams. Each directional beam covers a portion of the azimuth range. Multiple sectors are then adaptively combined for each received link. This sectorization is provides sufficient carrier-to-noise ratio (C/N) for the multi-user RAKE receiver 524 based "fine-tuned" beamforming and further supports operation on-the-move.

The multi-user RAKE (mRAKE) receiver 524 can process each of the directional beams output by the multi-channel beamformer module 523 and align symbols using scramble code correlation. This is because the mounted node 120 has significantly more processing capability than the dismount nodes, which allows more RAKE fingers to be processed by the mounted node 120 (compared to the dismount node). During RAKE receiver 524 processing, the multi-user RAKE receiver 524 processes signals received by the receive antennas 510-1, 510-2, 510-3, 510-4 with interference removed. In one embodiment, the multi-user RAKE receiver 524 performs RAKE receiver demodulation processing across multiple users aided by the OVSF separated pilot signal. Scramble code correlation is used to align symbols (e.g., perform symbol alignment without the overhead of framing or field counters).

The maximum likelihood ratio combiner module 526, the data despreader module 327, the gather, de-interleave and decoder block 528, the MAC module 530, and the input/output (I/O) interface 550 each operate similar to the corresponding elements of the dismount node 110 that are described above with reference to FIG. 3A. As such, the description of those modules will not be repeated here with respect to FIG. 5 for sake of brevity. Signal processing operation is enhanced due to additional computational resources afforded by the mounted unit.

Figure 6:
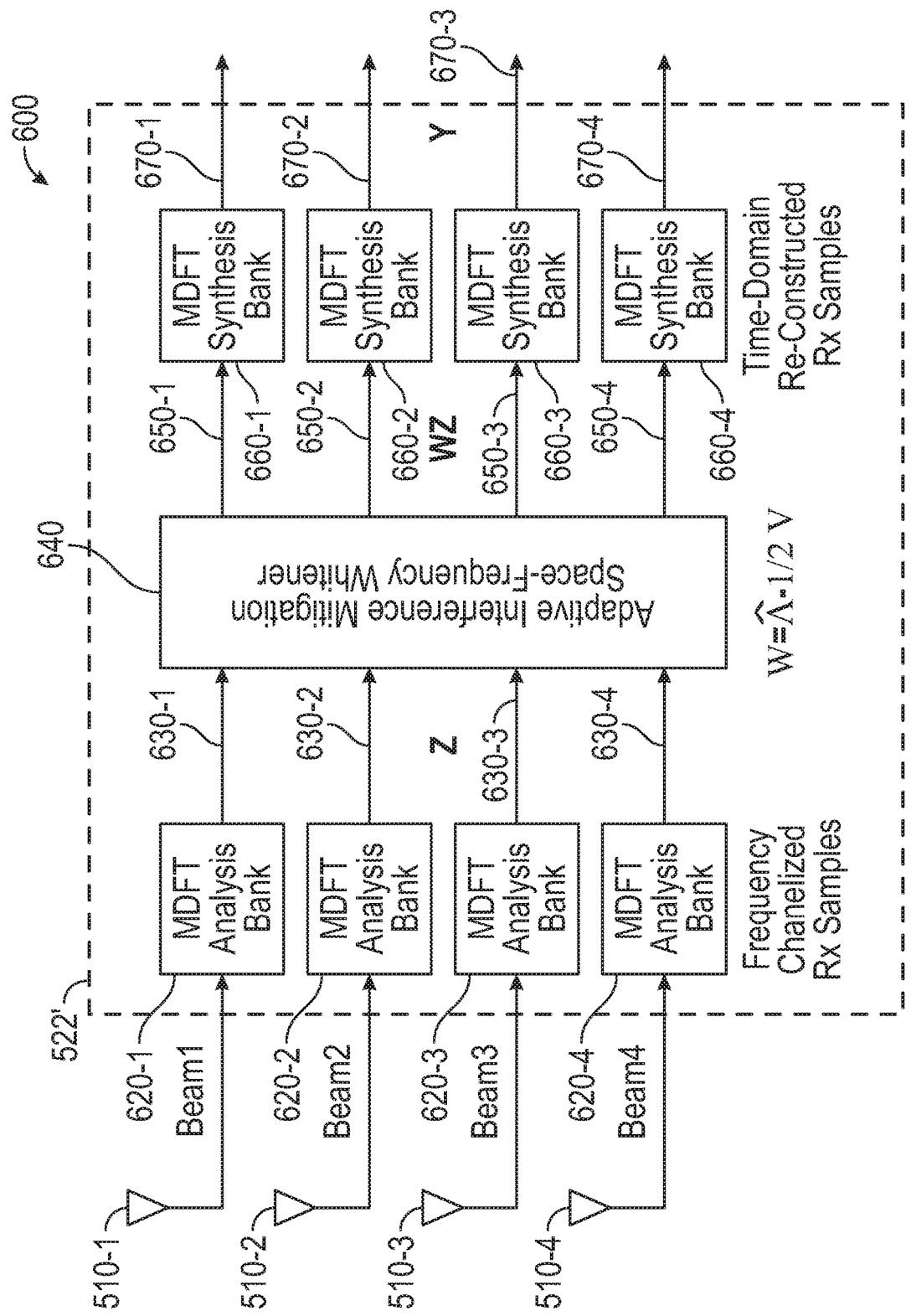
FIG. 6 is a block diagram that illustrates further details of one embodiment of the adaptive space-spectrum whitener of FIG. 5 in accordance with the disclosed embodiments.

FIG. 6 is a block diagram 600 that illustrates one non-limiting implementation of an adaptive space-spectrum whitener 522' that is part of the de-hop and the adaptive space-spectrum whitener 522 of FIG. 5 in accordance with the disclosed embodiments. Although the adaptive space-spectrum whitener 522' of FIG. 5 is implemented at the mounted node 120, it should be appreciated that the same adaptive space-spectrum whitener can be implemented within the de-hop and the adaptive space-spectrum whitener 322 of FIG. 3A. The number of antennas defines the spatial dimensionality and impacts the degrees of freedom. The increase in dimensionality permits an increase in effectiveness in certain scenarios.

The antenna array 510 (that includes antennas 510-1 . . . 510-4) is described above with reference to FIG. 5 and therefore the description of the antenna array 510 will not be repeated here with reference to FIG. 6. The adaptive space-spectrum whitener 522' is an interference mitigation module that includes a modified Discrete Fourier Transform (MDFT) analysis module that includes an MDFT analysis bank 620-1 . . . 620-4 corresponding to each antenna 510-1 . . . 510-4, an adaptive interference mitigation space-frequency whitener module 640, and a MDFT synthesis module that includes a MDFT synthesis bank 660-1 . . . 660-4 for each beam 650-1 . . . 650-4.

Each MDFT analysis bank 620-1 . . . 620-4 can receive a beam (e.g., a digitized spatial stream of frequency channelized RF samples) from a corresponding antenna 510-1 . . . 510-4. The RF samples from each of the four beams are digitized to preserve spatial diversity. Each MDFT analysis bank 620-1 . . . 620-4 can channelize the beam (e.g., digitized spatial stream) it receives in the spectral domain to generate a frequency channelized beam of samples 630-1 . . . 630-4 (also referred to herein as a channelized beam) to enable perfect (or near perfect) reconstruction.

Each channelized beam 630-1 . . . 630-4 generated by one of the MDFT analysis bank 620-1 . . . 620-4 includes multiple (e.g., 32) spectral channels. Together, the channelized beams 630-1 . . . 630-4 include a number of spectral-spatial channels. For example, in this non-limiting embodiment, where there are four MDFT analysis banks 620-1 . . . 620-4 (and hence four channelized beams 630-1 . . . 630-4) and 32 spectral channels per MDFT analysis bank 620-1 . . . 620-4, there would be 128 spectral-spatial channels (4 spatial by 32 spectral). Collectively, the channelized beams 630-1 . . . 630-4 form a spatial-spectral matrix (Z), where each row of the matrix represents spatial-spectral samples unique to its respective channelized beam, and where each column of the spatial-spectral matrix (Z) represents time indices. Stated differently, the spatial-spectral matrix (Z) is a matrix of time-frequency samples across the multiple antennas (i.e., the channelized spatial-spectral samples 630-1 . . . 630-4 from each MDFT analysis bank 620-1 . . . 620-4).

The adaptive interference mitigation space-frequency whitener module 640 receives the spatial-spectral matrix (Z), and applies a whitening matrix (W) to the spatial-spectral matrix (Z) to remove interference and preserve the signal of interest. Stated differently, the adaptive interference mitigation space-frequency whitener module 640 calculates the auto-correlation matrices across the relevant rows of matrix (Z) such that the resulting correlation matrix is white (diagonal matrix). As such, the adaptive interference mitigation space-frequency whitener module 640 can generate a whitened matrix (WZ) 650 that includes interference-mitigated spatial-spectral domain channels 650-1 . . . 650-4 (e.g., near interference-free). A received transmission from a node can appear across one or more receive spatial channels 510-1 . . . 510-4, and hence there are a corresponding number of spatial domain channels 650-1 . . . 650-4, each comprised of multiple (e.g., 32) whitened spectral or frequency channels. For instance, spatial domain channel 650-1 includes multiple whitened spectral channels (e.g., 32 spectral channels), spatial domain channel 650-2 includes multiple whitened spectral channels (e.g., 32 spectral channels), spatial domain channel 650-3 includes multiple whitened spectral channels (e.g., 32 spectral channels), and spatial domain channel 650-4 includes multiple whitened spectral channels (e.g., 32 spectral channels). Together, the spatial domain channels 650-1 . . . 650-4 include a number of whitened spectral-spatial channels. For example, in this non-limiting embodiment, where there are four spatial domain channels 650-1 . . . 650-4 each having 32 spectral channels, there would be 128 whitened spectral-spatial channels (4 spatial by 32 spectral).

The whitening matrix (W) offers the key linear combinations to mitigate interference. By judiciously choosing the relevant subset of respective eigenvalues A and eigenvectors from the auto-correlation of matrix (Z), the key linear combinations for mitigating interference are obtained via $w=\hat{\Lambda}^{1/2}V$. Whitening in the spectral domain offers the advantage of space-time whitening at significantly less complexity. Furthermore, channelization is adaptable to the expected environment.

Each MDFT synthesis bank 660-1 . . . 660-4 can receive one of the spatial-spectral domain channels 650-1 . . . 650-4 from the adaptive interference mitigation space-frequency whitener module 640, and perform a MDFT synthesis operation on that spatial-spectral domain channel 650-1 . . . 650-4 that it receives to generate a time-domain channelized signal 670-1 . . . 670-4 of reconstructed beam samples. Each time-domain channelized signal 670-1 . . . 670-4 represents a respective spatial channel. Collectively, the time-domain channelized signals 670-1 . . . 670-4 output by the MDFT synthesis banks 660-1 . . . 660-4 can output the reconstructed beam samples as a time-domain matrix (Y) 670. In other words, the MDFT synthesis banks 660-1 . . . 660-4 can re-construct the interference-mitigated whitened matrix (WZ) 650 back to a time-domain matrix (Y) 670. In this embodiment, the time-domain matrix (Y) 670 can then be processed by the multi-channel beamformer module 523 of FIG. 5.

By contrast, in the embodiment of FIG. 3A, dismount node has two receive antennas 310-1, 310-2, and the multi-channel beamformer module 523 of FIG. 5 is not present. Therefore, in this embodiment, the multi-user RAKE receiver 324 of FIG. 3A can receive two time-domain channelized signals 670-1, 670-2 from MDFT synthesis banks 660-1, 660-2. In other words, in the embodiment of FIG. 3A, the time-domain matrix (Y) 670 would include time-domain channelized signals 670-1, 670-2 from each MDFT synthesis bank 660-1, 660-2 that can then be processed by the multi-user RAKE receiver 324. In addition, it should be noted that if the dismount node only had a single antenna, then a space-spectrum whitener 522' of FIG. 6 is optional and whitening may or may not be applied depending on the implementation.

Although not illustrated in FIG. 6, in one non-limiting embodiment, the combination of the multi-channel beamformer module 523, the multi-user RAKE receiver 524 and the maximum likelihood ratio combiner module 526 can be referred to as a space-time receive code-based beamforming module. Although not illustrated, the space-time receive code-based beamforming module can receive space-time signal streams 670-1 ... 670-4 from each MDFT synthesis bank 660-1 ... 660-4 of FIG. 6, and derive the joint code-based-beamforming matrix (B) across all detected channels (e.g., all detected interference mitigated time-domain channelized signals). The space-time receive code-based beamforming module can then apply the joint code-based-beamforming matrix (B) to the time-domain matrix (Y) 670 to beam combine $\hat{X}=BY$, the various time-domain channels 670-1 ... 670-4 (e.g., the interference mitigated time-domain channelized signals). The space-time receive code-based beamforming module can then select a relevant sub-set of the interference mitigated time-domain channelized signals to generate a beam combined signal (or joint soft decision represented by vector $\hat{x}$) that can be processed by the gather, de-interleave and decoder block 528 of FIG. 5, which, as noted above, performs de-interleaving, forward error correction (FEC) and broadcast decoding on the joint soft decision received from the maximum likelihood ratio combiner module 526.

Further, as noted above with respect to FIG. 3A, the multi-user RAKE receiver 324 and the maximum likelihood ratio combiner module 326 collectively provide a multi-channel beamformer module that can perform distributed cooperative beamforming. Although not illustrated in FIG. 6, in one embodiment of a dismount node having two receive antennas 310-1, 310-2, the multi-channel beamformer module (not illustrated) of a dismount node can receive the interference mitigated time-domain channelized signals 670-1, 670-2 from each MDFT synthesis bank 660-1, 660-2 and can derive a joint code-based-beamforming matrix (B) across all relevant time-domain channelized signals; apply the joint code-based-beamforming matrix to the time-domain matrix to beam combine the time-domain channelized signals; and select a sub-set of the time-domain channelized signals to generate a beam combined signal. The signal of interest (SOI) does not necessarily exist across all the time-domain channelized signals. Depending upon the channel, the SOI may only exist on a subset of the received time-domain channelized signal space.

FIG. 7 is a table 700 that shows waveform attributes for a range of modes and throughput options that are supported in accordance with some non-limiting examples of the disclosed embodiments. In table 700, column 710 shows seven different modes of operation, while column 730 illustrates that cooperative broadcast diversity beam combining and multi-hop transmission are implemented in each of the seven different modes of operation from column 710. As noted above, the disclosed embodiments can utilize balanced FH/DSSS hybrid modes to help provide a Low Probability of Intercept/Low Probability of Detection (LPI/LPD) performance. The various examples shown in table 700 illustrate that these throughput options can be tailored based on Low Probability of Detection (LPD) and anti jam mission needs. Adaptive power control and multiple FEC modes help minimize RF emission.

Column 720 shows corresponding modulation characteristics for each of the seven different modes of operation from column 710. The first sub-column of column 720 indicates that frequency hopping is optional for all modes of operation, whereas the second sub-column of column 720 indicates that DSSS is used in all modes of operation. The third sub-column of column 720 shows a number of OVSF codes used in each of the seven different modes of operation from column 710. In this example, one OVSF code is used in modes of operation 1-3 from column 710, whereas two OVSF codes are used in the $3^{rd}$ mode of operation from column 710, and four OVSF codes are used in the $4^{th}$ through $7^{th}$ modes of operation from column 710. The fourth sub-column of column 720 shows the spreading factor used in each of the seven different modes of operation from column 710. In this example, a spreading factor of 32 is used in modes of operation 1-5 from column 710, whereas A spreading factor of 16 is used in the $6^{th}$ mode of operation from column 710 and a spreading factor of 8 is used in the $7^{th}$ mode of operation from column 710. The fifth and sixth sub-columns of column 720 show different types of modulation that can be used in each of the seven different modes of operation from column 710. In this example, BPSK modulation is used in the first and second modes of operation from column 710, whereas QPSK modulation is used in the $3^{rd}$ through $7^{th}$ modes of operation from column 710.

Column 740 shows different physical layer coding rate options for each of the seven different throughput modes of operation from column 710. The first sub-column of column 740 shows that broadcast coding is used in each of the seven different modes of operation from column 710. The second sub-column of column 740 shows that a 1/4 coding rate is used in the first mode of operation from column 710, while a 1/2 coding rate is used in the $2^{nd}$ and $3^{rd}$ modes of operation from column 710, and 3/4 coding rate is used in the $4^{th}$ through $7^{th}$ modes of operation from column 710.

Spectral efficiency is a function of forward error correction (FEC) rate. In one implementation, a 4096 symbol LDPC decoder is used with rates of 1/4, 1/2 and 3/4. A 1/4 code rate is less spectrally efficient than a 3/4 code rate and hence has higher detection ratio. The detection ratio is the ratio of squad-to-base range relative to squad-to-interceptor (or threat) range. For QPSK modulation, each I/Q rail is processed as a separate code word. The addition of multiple data channel OVSF further increases spectral efficiency to achieve higher throughput within the same spectrum. To minimize the processing impact of multiple FEC channels, higher rates only utilize higher coding rates. QPSK uses rate 1/2 and 3/4 codes, whereas multiple OVSF are QPSK and rate 3/4 only.

Column 770 shows effective information bit rates (in kilobytes/second). Column 770 includes two sub-columns 750, 760. Sub-column 750 shows effective information bit rates (in kilobytes/second) when operating in a hopping mode at 3600 hops/second, while sub-column 760 shows effective information bit rates (in kilobytes/second) when operating in a single frequency mode. As can be seen, the information bit rates supported by the FH/DSSS waveform can vary depending on the implementation. In this non-limiting implementation, the FH/DSSS waveform supports information rates in the range of 7 kbps-925 kbps through flexible Forward Error Correction (FEC) and structure afforded by DSSS codes. Column 770 illustrates that the effective information bit rates (in kilobytes/second) are greater when operating in a single frequency mode as opposed to when operating in a hopping mode at 3600 hops/second.

It is desirable to maximize the detection range ratio (i.e., larger detection ratios are better). Increasing the hop rate (e.g., shorter hop dwells) increases the detection ratio by requiring higher SNR at the interceptor. Faster hop rates provide for less integration of the noise and require higher SNR to maintain the same probability of detection and false alarm rate. The effect of increasing hop rate on the communication link require larger pilot power to provide channel information required for the RAKE receiver. Lower FEC rates enable lower received SINR operation, also requiring higher pilot power to provide channel information. Lower FEC rate and pilot SINR can be improved by reducing the hop rate.

As noted above, the hop rate and spreading rate of the FH/DSSS waveform can be selected to depending on the implementation. To help facilitate, low probability of intercept/low probability of detection (LPI/LPD) signaling, the proposed waveform is a hybrid FH/DSSS waveform hopping at a hop rate (kilohops/second) and simultaneously spreading at a certain chip rate (Megachips/second). For instance, in one implementation, the protected FH/DSSS waveform operates at 2.5 megachips/second (Mcps) and up to 10 kilohops/second, with a DSSS spreading factor of 32, 16 or 8.

Anti jam performance is a function of the jamming waveform and mode of operation. Low Probability of Detection (LPD) waveforms by their very nature defeat follower jammers. Anti jamming performance improves with increasing the number of hop frequencies and with reduction in data rate. The disclosed embodiments can help to provide anti jam communications by providing several different fast frequency hopping modes for the best anti jam performance. Joint spectral-spatial whitening helps provide anti jam and interference mitigation. Adaptive space-spectrum whitening on channelized spectrum provides performance of space-time whitening at significantly less complexity, and helps provide low risk interference/jammer mitigation. As shown in FIG. 7, the highest anti-jam performance is achieved with Mode 1, 7 kbps, operating at the highest hop rate, across the largest available spectrum.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A node configured to communicate in a cooperative broadcast multi-hop network that employs broadcast flood routing and multi-hop transmission using a direct-sequence spread-spectrum (DSSS) waveform, the node comprising:
one or more antennas each being configured to receive a plurality of DSSS signals, wherein the plurality of DSSS signals include transmissions that are directly received from other nodes and multi-path components of those transmissions; and
a waveform module coupled to the one or more antennas and having a receiver processing chain comprising:
a multi-user RAKE receiver configured to: receive a plurality of transmissions directly received from the other nodes and multipath components of transmissions received from the other nodes, the multi-user RAKE receiver comprising:
correlator blocks for each of the plurality of nodes, wherein each correlator block performs correlation for that particular node to determine channel-multipath correlations and generate one or more candidate fingers for that particular node; and
a finger selection module configured to receive the candidate fingers output from each correlator block and to select a subset of the candidate fingers having sufficient correlation for further processing;
a combiner module configured to: combine aligned symbols for the subset of candidate fingers on a per channel basis to generate a soft decision across each of a plurality of channels, and combine the soft decisions into a joint soft decision that comprises a coherently constructed signal that includes a coherently combined vector of chips of information from each of the plurality of channels; and
a data despreader module configured to: despread the chips of information from each of the plurality of channels to generate demodulated data symbols that are converted into data soft-decision bits.

2. The node according to claim 1, wherein the waveform module further comprises:
an adaptive space-spectrum whitener (ASSW) module; and
wherein the multi-user RAKE receiver comprises:
first and second correlation modules each being configured to receive channelized signals output by the ASSW module, wherein each channelized signal is a spatial stream, wherein each of the first and second correlation modules comprises: the correlator blocks for each of the plurality of nodes (1, . . . , N),
wherein each correlator block is driven by a unique scramble code that identifies transmissions from a particular node and performs correlation for that particular node by processing a spatial stream received from the ASSW module and the unique scramble code for that particular node to determine channel-multipath correlations and generate the one or more candidate fingers multipath location and respective complex weight, wherein each finger corresponds to a specific channel-signal pair for that particular node or a specific channel-multipath component pair for that particular node; and
wherein the finger selection module is configured to receive the candidate fingers output from each correlator block and to select the subset (1 . . . F) of the candidate fingers having the sufficient correlation by selecting which nodes contribute to the F total largest signal multipath components received.

3. The node according to claim 2, wherein the unique scramble code is a first code that is unique for that particular node that is logically combined with a security code.

4. The node according to claim 2, wherein the combiner module comprises:
  maximum likelihood ratio combiner module configured to:
    maximally ratio combine the aligned symbols for each of the subset (1 . . . F) of candidate fingers on a per channel basis to generate the soft decision across each of the plurality of channels; and
    combine the soft decisions into the joint soft decision.

5. The node according to claim 4, wherein the maximum likelihood ratio combiner module comprises:
  a plurality of processing modules comprising:
    a processing module for each of the other nodes that processes signals for that node, wherein each processing module comprises:
      a coherent combine module for that node configured to receive a number of the subset of the candidate fingers selected by the finger selection module, and coherently combine that number of the subset of the candidate fingers to generate an output signal;
      a descrambler for that node configured to descramble the output signal received from that coherent combine module using a unique descramble code for that node to generate a descrambled signal; and
      a pilot despreader module for that node configured to despread the descrambled signal to generate a despread pilot signal; and
  a coherent combiner module configured to coherently combine, using pilot soft-decision bits from each of the despread pilot signals for each node of the other nodes, each of the descrambled signals received across multiple nodes to generate the coherently constructed signal that includes the coherently combined vector of chips of information from each of the plurality of channels; and
  wherein the waveform module further comprises:
    a gather, de-interleave and decoder block configured to:
      a gather block configured to concatenate the data soft-decision bits from each hop across multiple received hops together to form codeword soft-decision bits; a de-interleaver block configured to de-interleave the codeword soft-decision bits; and a decoder block configured to perform low density parity check (LDPC) forward error correction (FEC) decoding and broadcast decoding on the codeword soft-decision bits to recover information bits corresponding to the complete codeword.

6. The node according to claim 1, wherein the one or more antennas comprise a first antenna and a second antenna, and wherein the plurality of DSSS signals from other nodes are received on the plurality of channels including a first particular channel, and wherein the one or more antennas are each configured to output at least the first particular channel that includes the plurality of DSSS signals, and wherein the
  second antenna is configured to receive a second plurality of DSSS signals from the other nodes on a second particular channel, and output the second particular channel that includes the second plurality of DSSS signals, wherein the second plurality of DSSS signals include transmissions that are directly received from the other nodes and multi-path components of those transmissions; and
  wherein the receiver processing chain further comprises:
    a de-hop module configured to: de-hop each of the received DSSS signals by tuning to a particular frequency to receive each DSSS signal and then channelizing input spectrum for each of the received DSSS signals to generate beam samples for each channelized signal; and
  an adaptive space-spectrum whitener (ASSW) module configured to:
    perform adaptive space-spectrum whitening to detect and remove interference signals received from each of the first and second particular channels by preforming a covariance analysis to generate a first channelized signal that comprises transformed beam samples for the first particular channel and a second channelized signal that comprises transformed beam samples for the second particular channel; and
    output the first and second channelized signals to first and second correlation modules of the multi-user RAKE receiver of that node.

7. The node according to claim 6, wherein the ASSW module comprises:
  a modified Discrete Fourier Transform (MDFT) analysis module comprising:
    a plurality of an MDFT analysis banks, wherein each MDTF analysis bank corresponds to one of the first and second antennas and is configured to:
      receive a beam from one of the first and second antennas in the spectral domain, wherein each beam comprises a digitized spatial stream of frequency channelized RF samples that are digitized to preserve spatial diversity; and
      channelize the beam to generate a channelized beam of frequency samples, wherein each channelized beam comprises multiple spectral channels, wherein the channelized beams collectively comprise a number of spectral-spatial channels equal to the product of the number of channelized beams and the multiple spectral channels, wherein the channelized beams collectively form a spatial-spectral matrix (Z) of time-frequency samples across the different one or more antennas;
  an adaptive interference mitigation space-frequency whitener module configured to: apply a whitening matrix (W) to the spatial-spectral matrix (Z) to remove interference and generate an interference-mitigated whitened matrix (WZ) that comprises a plurality of interference-mitigated spatial-spectral domain channels; and
  a MDFT synthesis module comprising:
    a plurality of MDFT synthesis banks that collectively re-construct the interference-mitigated whitened matrix (WZ) back to a time-domain matrix (Y) that comprises interference mitigated time-domain channelized signals,
    wherein each MDFT synthesis bank is configured to perform a MDFT synthesis operation on one of the spatial-spectral domain channels to generate an interference mitigated time-domain channelized signal of reconstructed beam samples, wherein each interference mitigated time-domain channelized signal represents a respective spatial channel.

8. The node according to claim 7, wherein each row of the spatial-spectral matrix (Z) represents spatial-spectral samples unique to one of the channelized beams, and wherein each column of the spatial-spectral matrix (Z) represents time indices.

9. The node according to claim 8, wherein the adaptive interference mitigation space-frequency whitener module is configured to calculate auto-correlation matrices across rows of the spatial-spectral matrix (Z) such that the resulting whitened matrix (WZ) is a diagonal correlation matrix.

10. The node according to claim 7, wherein the waveform module further comprises:
a maximum likelihood ratio combiner module that along with the multi-user RAKE receiver collectively provides:
a multi-channel beamformer module being configured to perform cooperative beamforming on a per channel basis by processing the time-domain matrix (Y) and coherently combining a subset of transmissions and multipath components for each transmission that are received from other nodes together,
wherein the subset of transmissions and multipath components are those having signal strength greater than or equal to a threshold, and
wherein coherently combining is accomplished by time aligning the respective signals of interest, and removing frequency offset and phase offset from each transmission.

11. The node according to claim 10, wherein the multi-channel beamformer module is configured to:
receive the interference mitigated time-domain channelized signals from each MDFT synthesis bank;
derive a joint code-based-beamforming matrix (B) across all detected interference mitigated time-domain channelized signals;
apply the joint code-based-beamforming matrix to the time-domain matrix to beam combine the interference mitigated time-domain channelized signals; and
select a sub-set of the interference mitigated time-domain channelized signals to generate a beam combined signal.

12. The node according to claim 7, wherein the one or more antennas of the node further comprise:
a third antenna and a fourth antenna, the third antenna being configured to receive a third plurality of DSSS signals from other nodes on a third particular channel, and output the third particular channel that includes the third plurality of DSSS signals, the fourth antenna being configured to receive a fourth plurality of DSSS signals from other nodes on a fourth particular channel, and output the fourth channel that includes the fourth plurality of DSSS signals, wherein the third and fourth plurality of DSSS signals each include transmissions that are directly received from other nodes and multipath components of those transmissions, wherein the first, second, third and fourth antennas are part of a multi-band phased antenna array that includes the first, second, third and fourth antennas; and
wherein the receiver processing chain of the waveform module further comprises:
a space-time receive code-based beamforming module, comprising:
a multi-channel beamformer module being configured to: perform adaptive beamforming on a per channel basis, wherein the multi-channel beamformer module performs a matrix operation that linearly transforms interference mitigated time-domain channelized signals to coherently combine the interference mitigated time-domain channelized signals into a smaller number ($N_T$) of directional beams;
the multi-user RAKE receiver being configured to process each of the directional beams output by the multi-channel beamformer module and align symbols using scramble code correlation; and
a maximum likelihood ratio combiner module.

13. The node according to claim 12, wherein the multi-channel beamformer module is configured to:
receive the interference mitigated time-domain channelized signals from each MDFT synthesis bank;
derive a joint code-based-beamforming matrix (B) across all detected interference mitigated time-domain channelized signals;
apply the joint code-based-beamforming matrix to the time-domain matrix to beam combine the interference mitigated time-domain channelized signals; and
select a sub-set of the interference mitigated time-domain channelized signals to generate a beam combined signal.

14. The node according to claim 12, wherein the transmissions received across each of the antennas of the multi-band antenna array are coherently combined on a per channel basis to generate a corresponding directional beam, wherein each directional beam covers a portion of an azimuth range.

15. The node according to claim 12, wherein node further comprises:
a power control module configured to: encode originating transmit power in a message to support adaptive power control and encode channel status information in the message so that channel status of the cooperative broadcast multi-hop network is propagated to each of the other nodes of the cooperative broadcast multi-hop network; and
wherein the node, when transmitting as an original sender of a transmission, is configured to broadcast a particular message on odd numbered hop intervals to propagate the originating transmit power channel status information to the other nodes in the cooperative broadcast multi-hop network.

16. The node according to claim 15, wherein each of the other nodes that receive the particular message is configured to:
process the channel status information to estimate a receive signal-to-noise (SNR);
determine, based on the estimated receive SNR and the originating transmit power, whether transmit power of that node should be adjusted before transmitting or relaying a message; and
when it is determined that transmit power of that node is to be adjusted: adjust current transmit power of that node; and re-transmit messaging including current transmit power on even numbered hop intervals.

17. The node according to claim 15, wherein the particular message is one or more of:
a push-to-talk (PTT) message; and
a synchronization message that is regularly broadcast a synchronization channel to maintain time synchronization relative to a master node so that transmissions of the nodes are synchronized to arrive within a same reception window of the multi-user RAKE receiver.

18. The node according to claim 1, wherein the DSSS waveform is a frequency-hopping direct-sequence spread-spectrum (FH/DSSS) waveform in which DSSS modulation is combined with frequency hopping (FH) between DSSS channels to provide a hybrid FH/DSSS modulation format, and wherein the FH/DSSS waveform has a hop rate and a spreading rate that are adjustable, and
wherein the node further comprises:
a beamformer and hop assignment module comprising:
a hop assignment module that includes a Fast-Frequency Hopping (FFH) transmitter configured to assign a hop number for transmissions by that node, wherein a hop number is a function of time, and a hop frequency is based on pseudo-random sequence; and a beamformer module configured to update amplitude and phase weightings of a DSSS signal that is provided to the one or more antennas.

19. The node according to claim 1, wherein the node comprises:

a different interleaver module than the other nodes.

20. The node according to claim 1, wherein the node is configured to:

transmit transmissions that are modulated using: a unique scramble code for that node that identifies transmissions from that node to distinguish them from transmissions by other nodes that are part of the cooperative broadcast multi-hop network and a common scramble code that is shared with the other nodes, wherein each transmission by the node is a DSSS signal having DSSS waveform;

broadcast transmissions on a unique channel for that node when transmitting as an original sender of a transmission, wherein the unique channel for the node is defined by an odd numbered hop interval assigned to that node and the unique scramble code assigned to that node;

receive transmissions from other nodes that are original senders and multipath components thereof on the odd numbered hop intervals;

re-transmit, when operating as a relay node, any transmissions that are received error free from the other nodes on another unique channel for that node that is defined by an even numbered hop interval assigned to that node and the unique scramble code assigned to that node; and receive re-transmitted transmissions from other nodes that are relays and multipath components thereof on the even numbered hop intervals.

\* \* \* \* \*